(12) United States Patent
Roberts et al.

(10) Patent No.: US 7,100,485 B2
(45) Date of Patent: Sep. 5, 2006

(54) BLIND AND SHADE CUTTING CENTER

(75) Inventors: David Roberts, Greensboro, NC (US);
Thomas A. Caputo, Greensboro, NC (US); Richard D. Coulcher, Jr., Greensboro, NC (US); David A. Schwartz, High Point, NC (US)

(73) Assignee: Newell Window Furnishings, Inc., Freeport, IL (US)

( * ) Notice: Subject to any disclaimer, the term of this patent is extended or adjusted under 35 U.S.C. 154(b) by 26 days.

(21) Appl. No.: 10/235,477

(22) Filed: Sep. 5, 2002

(65) Prior Publication Data

US 2003/0024359 A1 Feb. 6, 2003

Related U.S. Application Data

(62) Division of application No. 09/911,292, filed on Jul. 23, 2001, now Pat. No. 6,604,443.

(51) Int. Cl.
*B26D 7/18* (2006.01)
*B26D 3/00* (2006.01)

(52) U.S. Cl. .............. 83/100; 83/167; 83/198; 83/471.2

(58) Field of Classification Search ............ 83/100, 83/167, 197, 198, 471.2, 522.19
See application file for complete search history.

(56) References Cited

U.S. PATENT DOCUMENTS

| 239,691 A | | 4/1881 | Appleton | |
|---|---|---|---|---|
| 421,027 A | | 2/1890 | Hammond | |
| 702,200 A | * | 6/1902 | Greene | 83/522.19 X |
| 1,382,433 A | | 6/1921 | McCarty | |
| 1,647,254 A | | 11/1927 | Simmons | |
| 1,721,276 A | | 7/1929 | Marsilius | |
| 1,792,522 A | | 2/1931 | Yates | |
| 1,924,162 A | | 8/1933 | Mason | |
| 2,057,488 A | | 10/1936 | Hochstadt | |
| 2,067,488 A | | 1/1937 | Hochstadt | |
| 2,418,515 A | | 4/1947 | Lewis | |
| D155,897 S | | 11/1949 | Huntington | |
| 2,631,508 A | | 3/1953 | Muehling | |
| 2,644,520 A | | 7/1953 | Nelson | |
| 2,691,994 A | | 10/1954 | Ferguson | |
| 2,747,625 A | * | 5/1956 | Small | 83/471.2 X |
| 2,789,639 A | | 4/1957 | Lorentzen | |
| 2,806,493 A | * | 9/1957 | Gaskell | 83/522.19 X |
| 2,827,686 A | | 3/1958 | Adelman | |
| 2,883,736 A | | 4/1959 | Crane | |

(Continued)

FOREIGN PATENT DOCUMENTS

| CA | 2136519 | 5/1996 |
|---|---|---|
| CA | 2355507 | 2/2003 |
| DE | 223 048 C | 6/1910 |
| DE | 857 677 C | 12/1952 |
| EP | 265564 | 5/1988 |
| EP | 273535 | 7/1988 |
| EP | 0 629 475 A1 | 6/1994 |
| GB | 1 213 388 A | 11/1970 |
| GB | 2 258 686 A | 2/1993 |
| TW | ROC 250743 | 7/1995 |
| TW | ROC 269841 | 2/1996 |
| WO | WO01/07747 | 2/2001 |
| WO | WO03/010408 | 2/2003 |

*Primary Examiner*—Charles Goodman
(74) *Attorney, Agent, or Firm*—Marshall, Gerstein & Borun LLP

(57) ABSTRACT

A method and apparatus for sizing window coverings slidably extendable from a bay into an aisle of a retail outlet. The method includes the steps of locating the center of the window covering relative to a cutting station utilizing a half scale for removing a portion of the window covering from each of its ends.

15 Claims, 12 Drawing Sheets

U.S. PATENT DOCUMENTS

| | | |
|---|---|---|
| 3,260,146 A | 7/1966 | Child |
| 3,263,544 A | 8/1966 | Margolien |
| 3,292,232 A | 12/1966 | Nilsson |
| 3,391,591 A | 7/1968 | Funke |
| 3,470,926 A | 10/1969 | Dohm |
| 3,513,740 A | 5/1970 | Burghart |
| 3,564,893 A | 2/1971 | Richards et al. |
| 3,584,380 A | 6/1971 | Mehler et al. |
| 3,618,297 A | 11/1971 | Hamrick |
| 3,634,975 A | 1/1972 | Hensley |
| 3,664,221 A | 5/1972 | Breetvelt |
| 3,677,117 A | 7/1972 | Cuter |
| 3,735,631 A | 5/1973 | Schmoll |
| 3,736,631 A | 6/1973 | Edixhoven |
| 3,750,509 A | 8/1973 | Kruse |
| 3,766,815 A | 10/1973 | Edixhoven |
| 4,055,206 A | 10/1977 | Griffin |
| 4,067,252 A | 1/1978 | Peddinghaus et al. |
| 4,139,043 A | 2/1979 | Donofrio |
| 4,151,768 A | 5/1979 | Shockovsky |
| 4,188,693 A | 2/1980 | Edixhoven |
| 4,201,256 A | 5/1980 | Truhan |
| 4,214,493 A * | 7/1980 | Elhaus ............... 83/100 |
| 4,227,902 A | 10/1980 | Olson |
| 4,230,005 A * | 10/1980 | Varga ............... 83/100 |
| 4,233,782 A | 11/1980 | Perrault |
| 4,270,253 A | 6/1981 | Herb et al. |
| 4,338,710 A | 7/1982 | Stursa et al. |
| 4,367,665 A * | 1/1983 | Terpstra et al. ....... 83/100 |
| 4,407,614 A | 10/1983 | Muhr et al. |
| 4,457,197 A | 7/1984 | Wepner et al. |
| 4,468,995 A | 9/1984 | Mireles-Saldivar |
| 4,492,301 A | 1/1985 | Inaba et al. |
| 4,545,100 A | 10/1985 | Gaillard et al. |
| 4,567,930 A | 2/1986 | Fischer |
| 4,576,072 A | 3/1986 | Terpstra et al. |
| 4,606,099 A | 8/1986 | Schluep et al. |
| 4,625,868 A | 12/1986 | Bischof |
| 4,639,987 A | 2/1987 | Georgopoulos |
| 4,721,058 A | 1/1988 | Hayamizu et al. |
| 4,730,372 A | 3/1988 | Tsuchida |
| 4,771,667 A | 9/1988 | Forman et al. |
| 4,790,226 A | 12/1988 | Tsuchida |
| 4,807,363 A | 2/1989 | Clifton, Jr. |
| 4,819,530 A | 4/1989 | Huang |
| 4,823,449 A | 4/1989 | Chang |
| 4,876,795 A | 10/1989 | Chun-cheng |
| 4,901,419 A | 2/1990 | Voss |
| 4,907,325 A | 3/1990 | Hsu |
| 4,907,337 A | 3/1990 | Krüsi |
| 4,924,740 A | 5/1990 | Wright |
| 4,928,369 A | 5/1990 | Schnebly et al. |
| 4,987,765 A | 1/1991 | Nishimura et al. |
| 4,993,131 A | 2/1991 | Graves et al. |
| D316,979 S | 5/1991 | Reynolds |
| 5,037,253 A | 8/1991 | Molaro et al. |
| 5,054,206 A | 10/1991 | Carlson |
| 5,056,388 A | 10/1991 | Dekker et al. |
| 5,060,709 A | 10/1991 | Simon |
| 5,072,494 A | 12/1991 | Graves et al. |
| 5,103,702 A | 4/1992 | Yannazzone |
| 5,119,854 A | 6/1992 | Chanoine et al. |
| 5,215,512 A | 6/1993 | De Dompierre |
| 5,251,382 A | 10/1993 | Hellar |
| 5,339,716 A | 8/1994 | Sands et al. |
| 5,392,524 A | 2/1995 | Hill |
| 5,456,149 A | 10/1995 | Elsenheimer et al. |
| 5,787,774 A | 8/1998 | Richards et al. |
| 5,799,557 A | 9/1998 | Wang |
| 5,806,245 A | 9/1998 | Satrom |
| 5,806,394 A | 9/1998 | Marocco |
| 5,816,126 A | 10/1998 | Pluber |
| 5,819,619 A * | 10/1998 | Miller et al. ............ 83/100 |
| 5,826,317 A | 10/1998 | van Oostrom et al. |
| 5,882,155 A | 3/1999 | Testa, Jr. |
| 5,927,172 A | 7/1999 | Wang |
| 5,971,839 A | 10/1999 | Schmelzer |
| 6,003,217 A | 12/1999 | Graves et al. |
| 6,003,218 A | 12/1999 | Schumann et al. |
| 6,079,306 A | 6/2000 | Liu |
| 6,089,134 A | 7/2000 | Marocco |
| 6,142,196 A | 11/2000 | Schumann et al. |
| 6,178,857 B1 | 1/2001 | Marocco |
| 6,334,379 B1 * | 1/2002 | Sudano ............... 83/452 |
| 6,336,388 B1 | 1/2002 | Marocco |
| 6,405,406 B1 * | 6/2002 | Chen ................. 15/331 |
| 6,412,381 B1 * | 7/2002 | Wang et al. ........... 83/454 |
| 6,427,571 B1 * | 8/2002 | Hsu ................. 83/454 |
| 6,535,294 B1 | 3/2003 | Arledge, Jr. et al. |
| 6,561,121 B1 | 5/2003 | Rose |
| 6,615,698 B1 | 9/2003 | Chuang et al. |
| 6,783,563 B1 | 8/2004 | Eckhoff et al. |
| 2002/0117039 A1 | 8/2002 | Huang |
| 2002/0178884 A1 * | 12/2002 | Chuang et al. ......... 83/100 X |
| 2003/0033919 A1 | 2/2003 | Lin |
| 2003/0066403 A1 | 4/2003 | LIn |
| 2003/0110913 A1 | 6/2003 | Chen |
| 2003/0140756 A1 | 7/2003 | Lin |

* cited by examiner

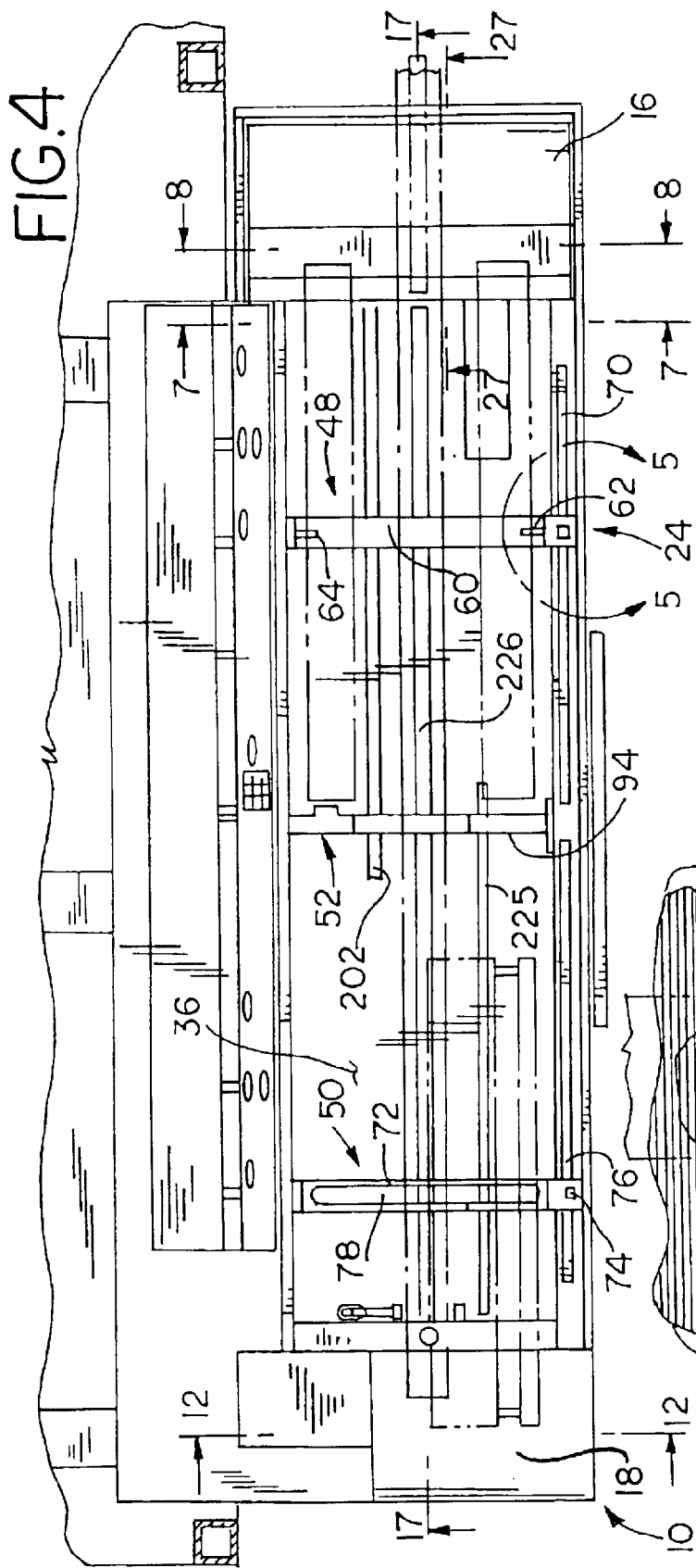
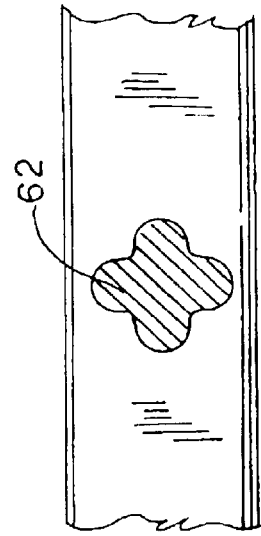
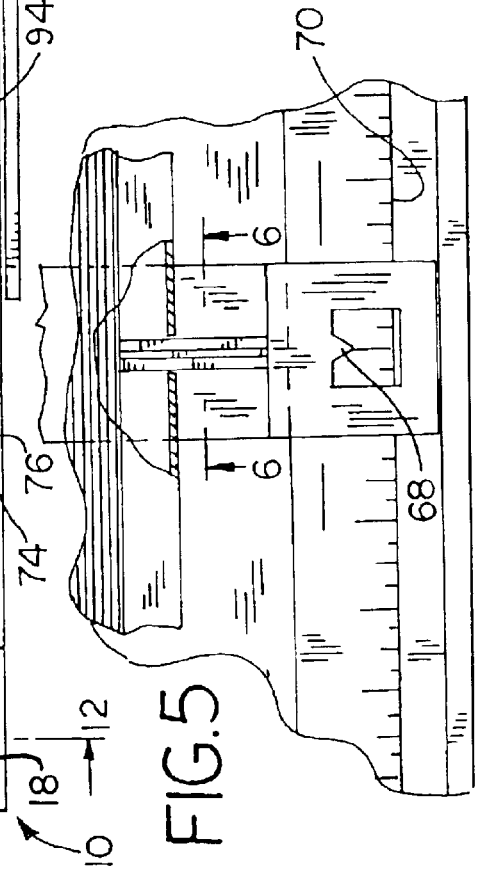

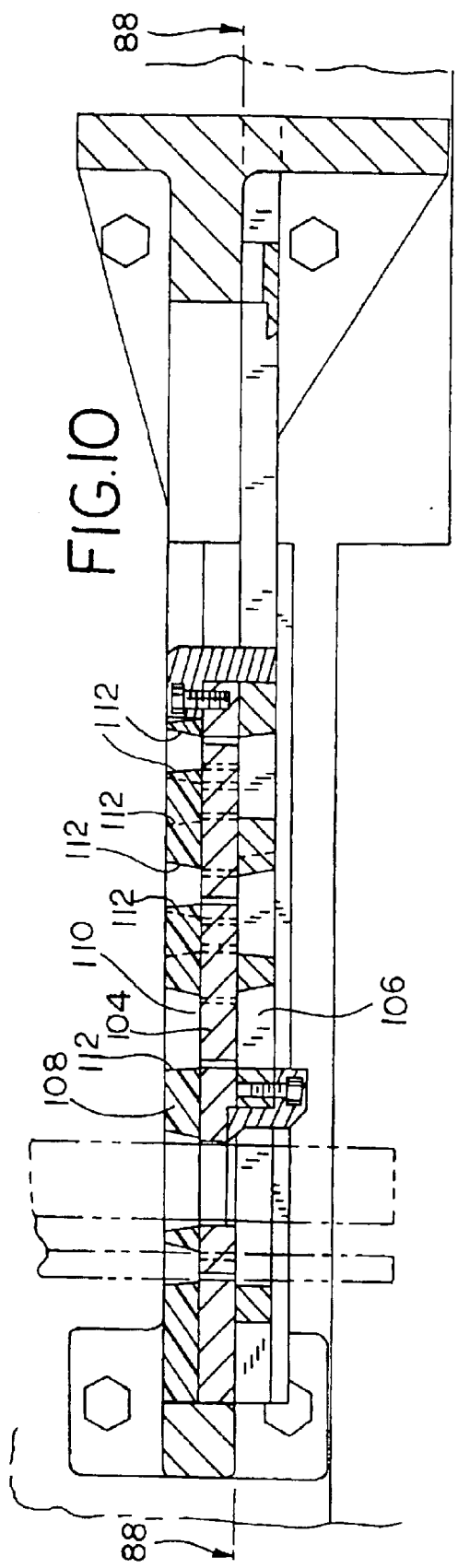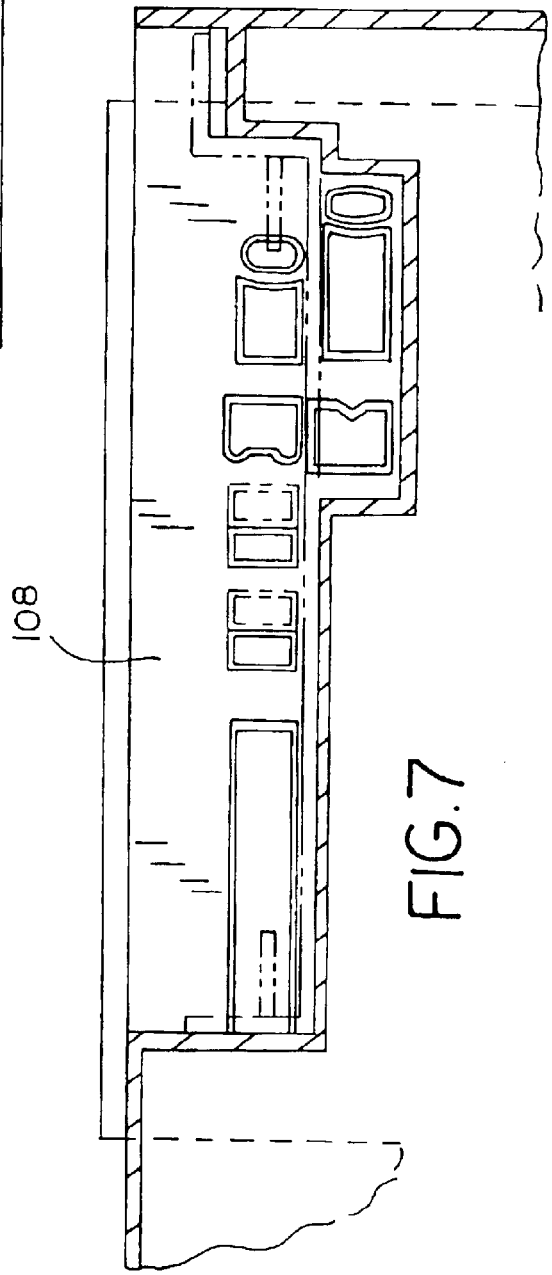

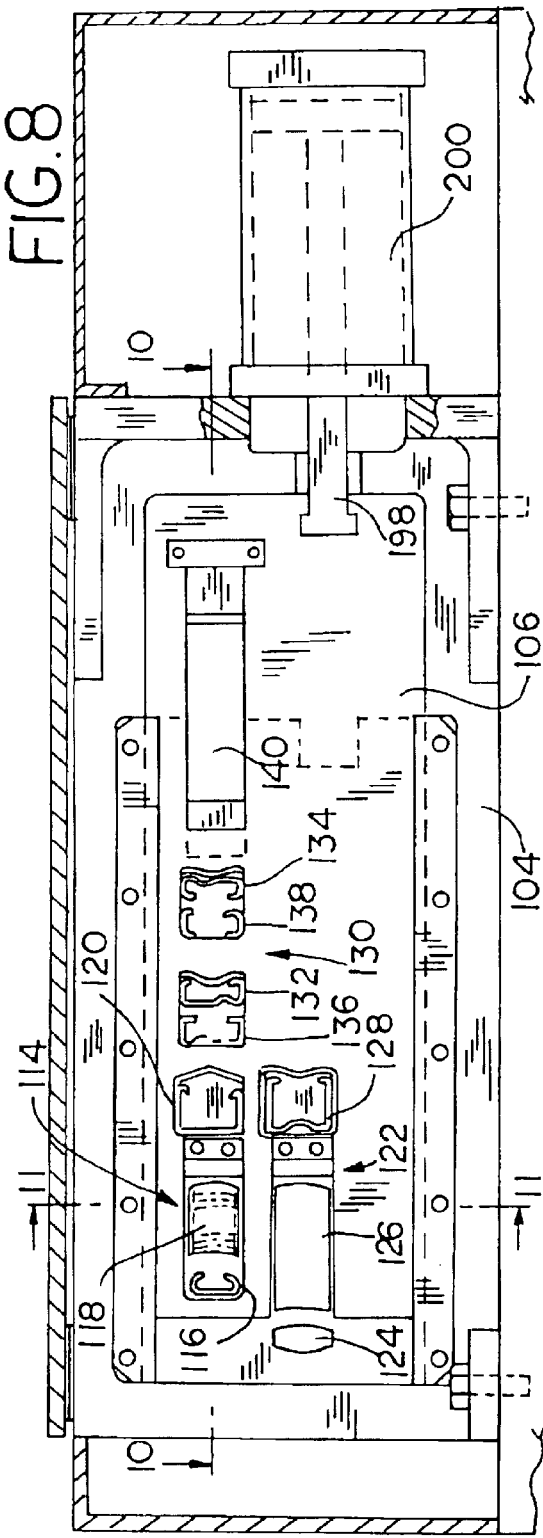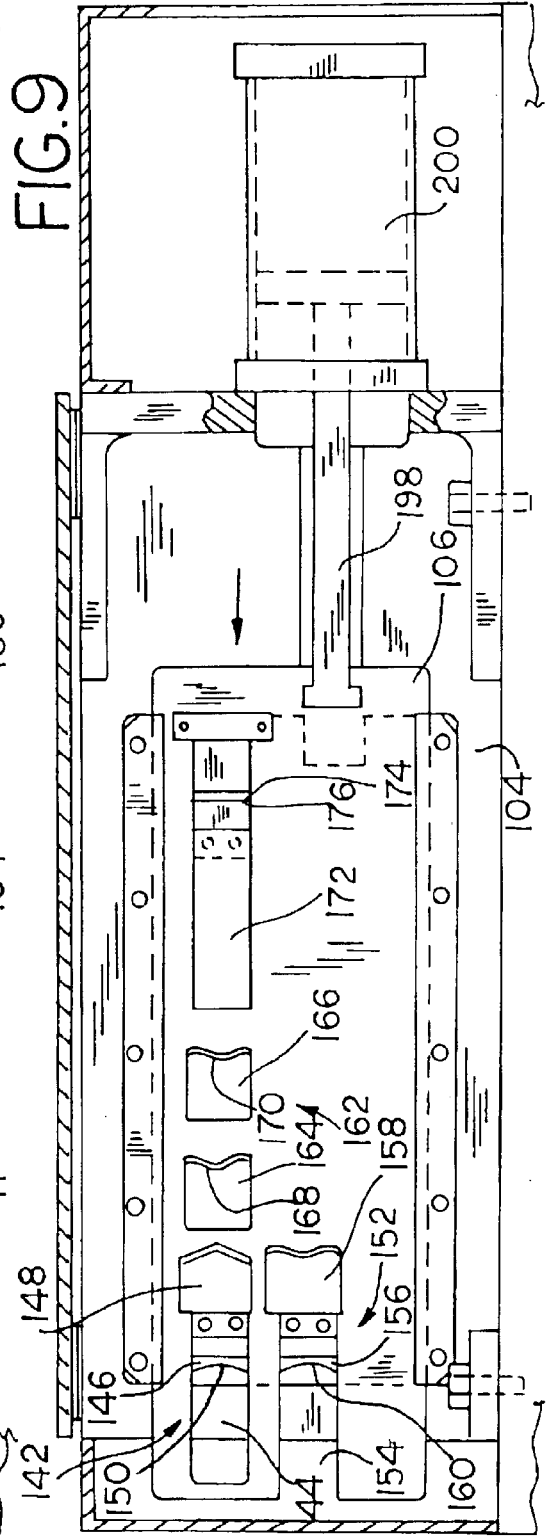

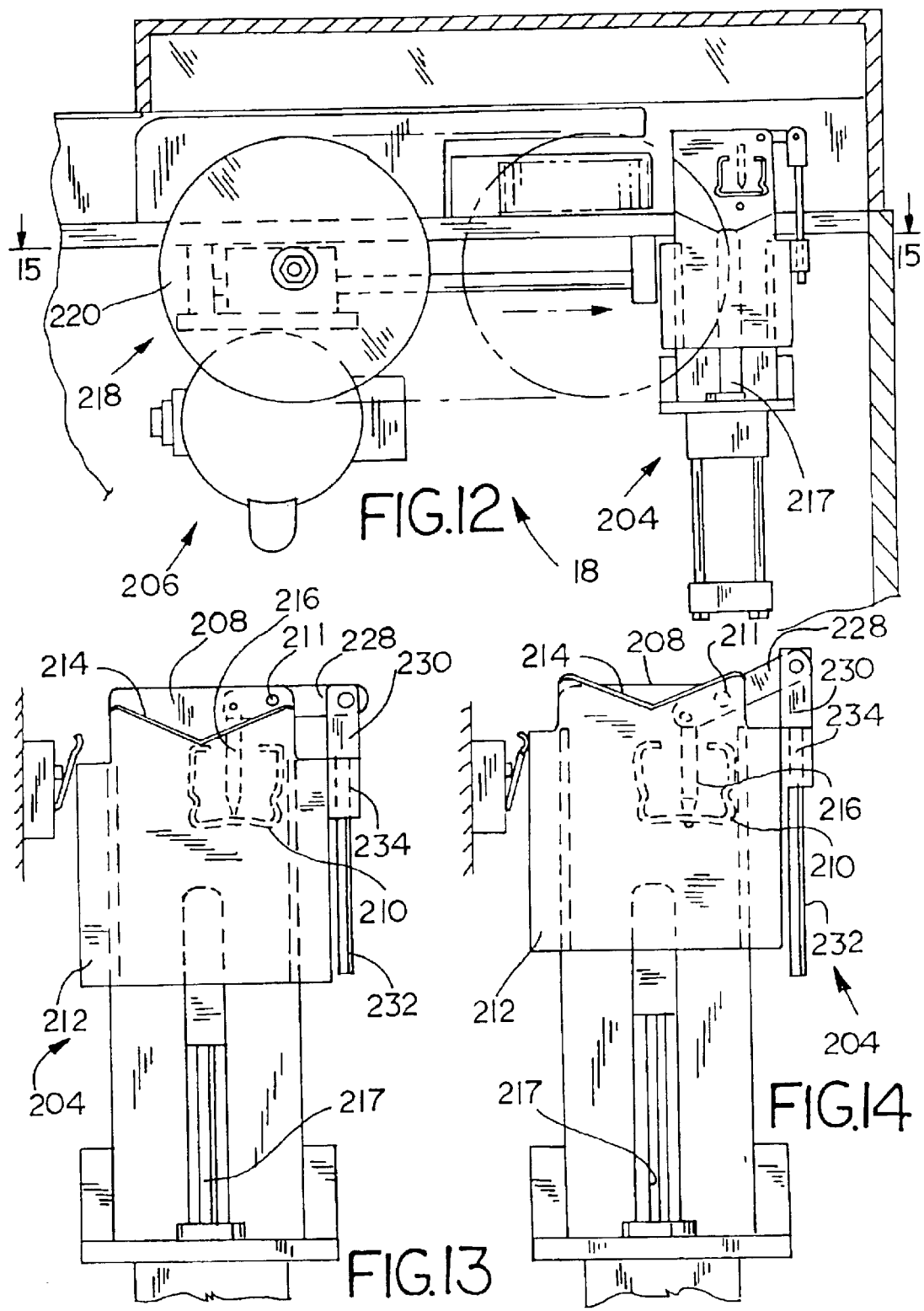

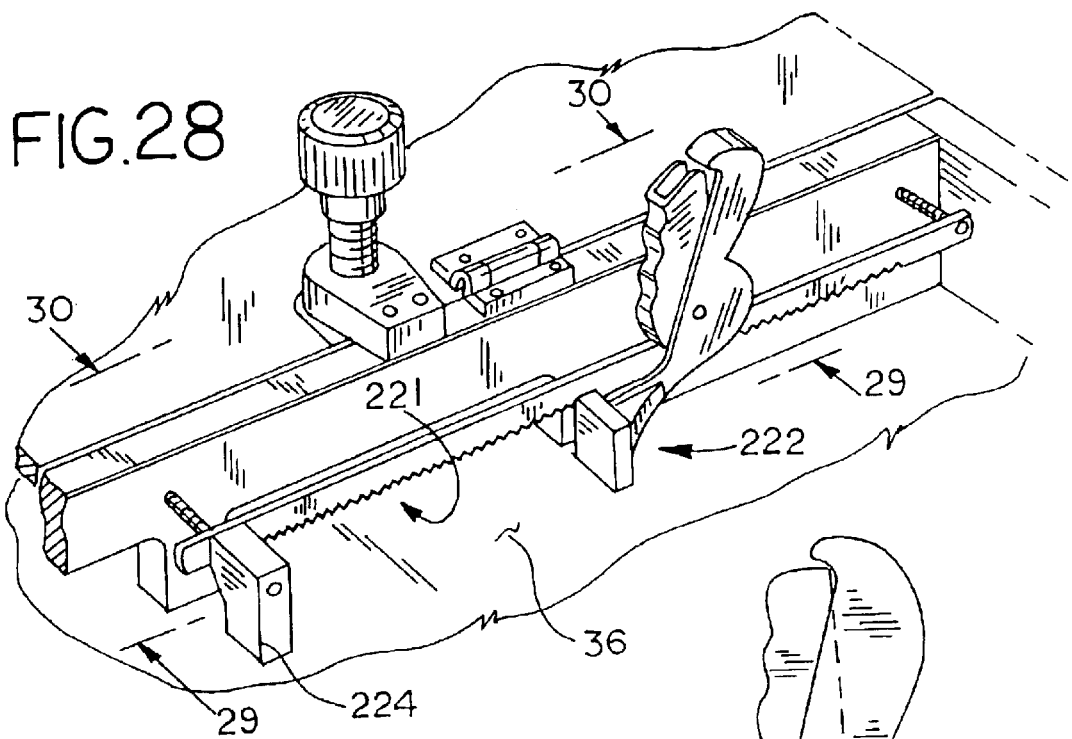
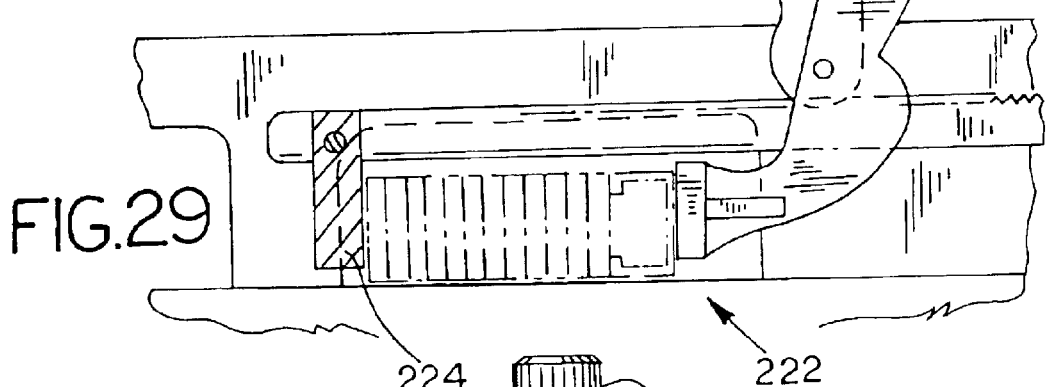
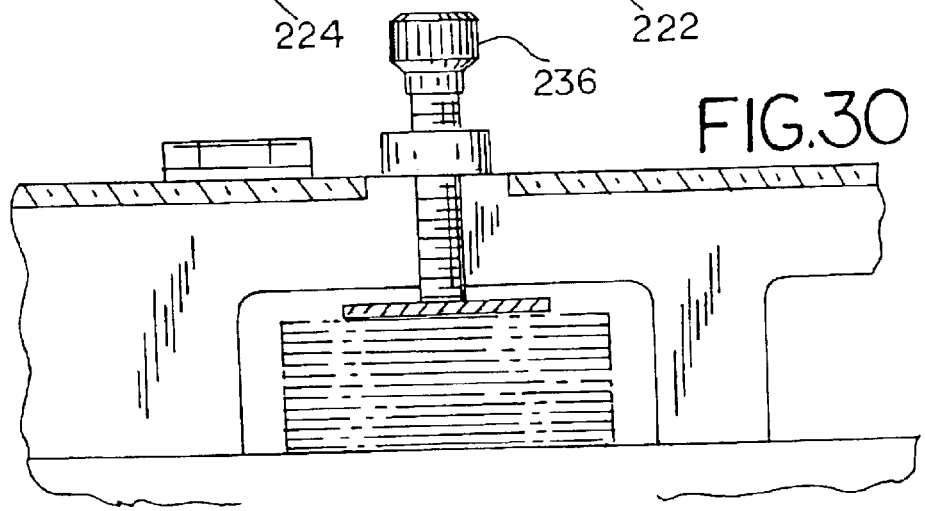

BLIND AND SHADE CUTTING CENTER

STATEMENT OF RELATED APPLICATIONS

The present application is a division of U.S. Ser. No. 09/911,292, filed on Jul. 23, 2001 now U.S. Pat. No. 6,604,443.

FIELD OF THE INVENTION

The present invention relates generally to the field of window covering sizing machines and more particularly to a blind and shade cutting center.

BACKGROUND OF THE INVENTION

Mass retail merchandisers sell a large number of window coverings directly to consumers. Standard sized window coverings are sized to a consumer's specifications while the consumer waits. The apparatus employed to size the various window coverings must be both easy to use by an employee of a retail outlet and should not require an extensive training period.

Additionally, the floor space that the cutting apparatus requires should fit within the existing structure and layout of the retail outlet. Further, the cutting apparatus ideally should size a number of different types of window coverings, such as metal or vinyl mini-blinds, vertical blinds, pleated shades, and cellular shades.

Various attempts have been made to integrate various window covering cutting mechanisms into a single multi-station system. One example of a multi-station system is disclosed in U.S. Pat. No. 5,456,149 to Elsenheimer et al. entitled "Sizing System for Window Coverings" issued Oct. 10, 1995. The '149 Patent discloses a station having a flip-top surface including a pleated shade sizing station on one side and a mini-blind sizing station on the other. This system minimizes the space required by the merchandiser to cut various window covering products. This allows the retail outlet to include other stock and products in space otherwise occupied by various window covering sizing equipment.

Recently more retail merchandisers utilize 8-foot bay spacing to display and sell various products. Accordingly, a shade and blind cutting center that can be located within the 8-foot bay environment is needed.

The sale of vertical blind products has also increased through mass merchandiser retail outlets, requiring the ability to size not only the width of the vertical blind head rail but also the length of the vertical blind slats. However, if a cutting apparatus is to be located within an 8-foot bay environment, any vertical blind slat extending greater than 8 feet would not be able to be sized with an apparatus located within the 8-foot bay. Accordingly, there is a need for a vertical blind cutting apparatus that would fit within the 8-foot bay environment as well as be able to size vertical blind slat product having a length greater than 8 feet.

BRIEF DESCRIPTION OF THE DRAWINGS

The invention will become more fully understood from the following detailed description, taken in conjunction with the accompanying drawings.

FIG. 4 is a top plan view of the apparatus of FIG. 2 FIG. 5 is a top partial view of the area taken generally along lines 5—5 of FIG. 4.

FIG. 6 is a cross-sectional view of the locator pin taken generally along lines 6—6 of FIG. 5.

FIG. 7 is a cross-sectional view of the die assembly of the first cutting station taken generally along lines 7—7 of FIG. 4.

FIG. 8 is a cross-sectional view of the die and blade mechanism of the first cutting apparatus taken generally along lines 8—8 of FIG. 4.

FIG. 9 is the die and blade portion of the first cutting apparatus of FIG. 8 in the fully extended cutting position.

FIG. 10 is a cross-sectional view of the blade and die apparatus of FIG. 8 taken generally along lines 10—10 of FIG. 8.

FIG. 12 is a cross-sectional view of the second cutting station taken generally along lines 12—12 of FIG. 4.

FIG. 13 is a view of the head rail cutting mechanism with the die in the raised position.

FIG. 14 is a view of the head rail cutting mechanism die cutter in the raised position with the punch mechanism fully extended.

FIG. 28 is a perspective view of the vertical slat clamp and wooden blind clamp.

FIG. 29 is a partial side view of the wooden blind clamp.

FIG. 30 is a partial cross-sectional view of the vertical slat clamp.

DETAILED DESCRIPTION OF THE PREFERRED EMBODIMENTS

Figure 1:
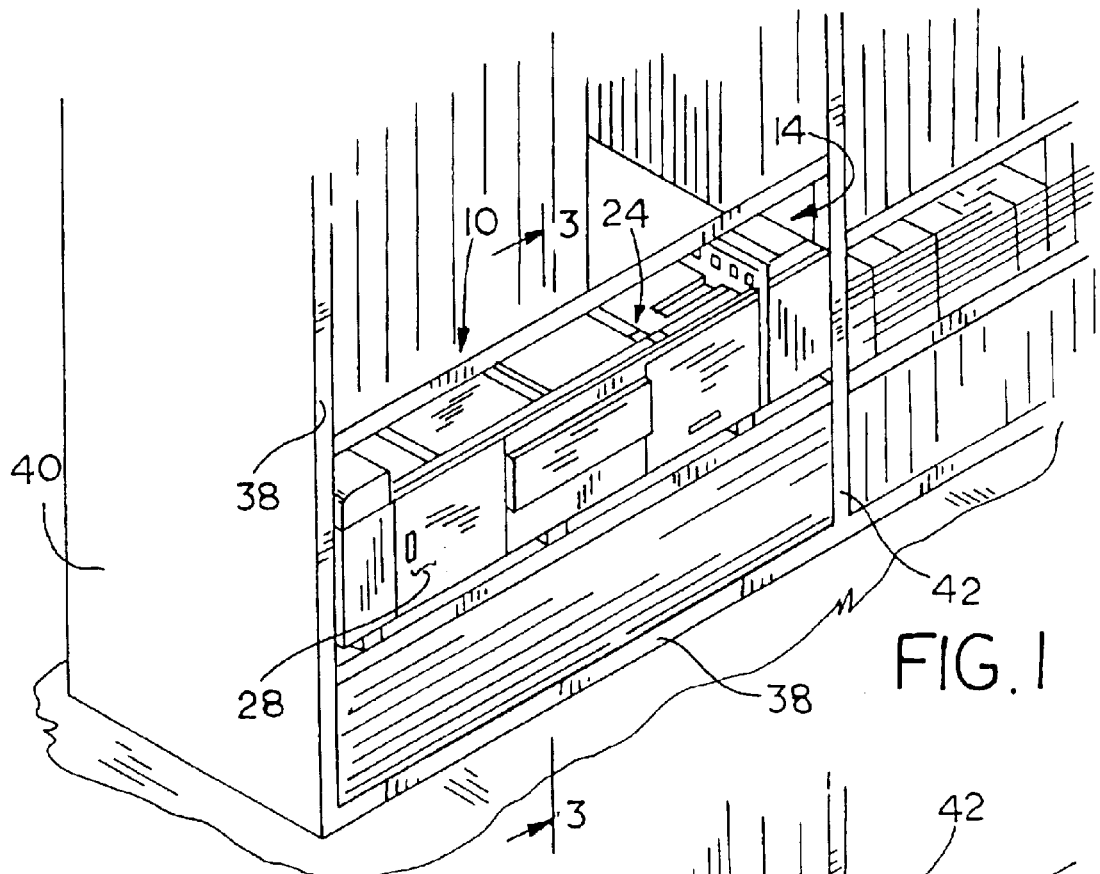
FIG. 1 is a perspective view of the apparatus located in a bay in a stored position.

An apparatus for sizing both blinds and shades for window coverings is generally illustrated in FIG. 1. The blind and shade cutting center 10 is slidably movable on rails 12 in and out of a bay 14. The cutting center 10 includes a first cutting station 16 for sizing mini-blinds, pleated shades, and cellular shades. The cutting center further includes a second cutting station 18 for sizing wooden blinds and vertical blinds. The first and second cutting stations 16, 18 are supported by and located on opposing ends of a housing 20. A controller mechanism 22 allows an operator to gain access and to control the first and second cutting stations 16, 18. Further, cutting center 10 includes a center locating and measuring system 24 to position the blinds and shades to be sized.

Figure 3:
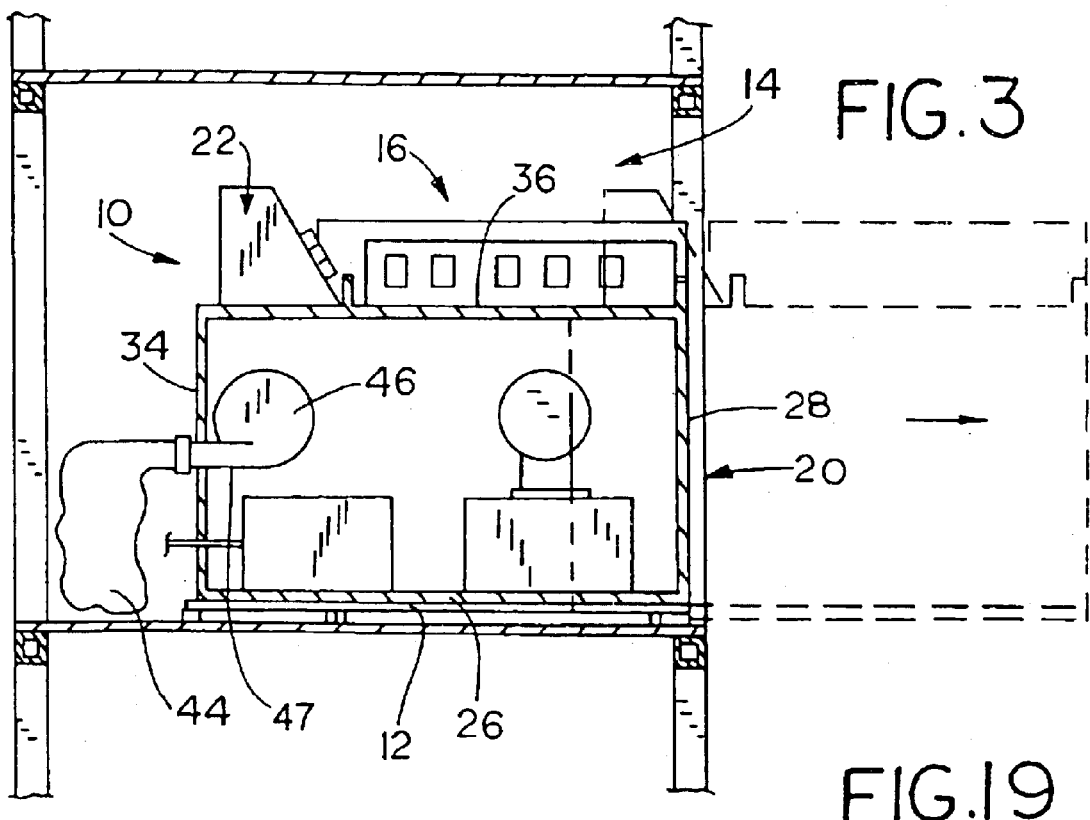
FIG. 3 is a cross-sectional view of the apparatus taken generally along lines 3—3 of FIG. 1.
Figure 17:
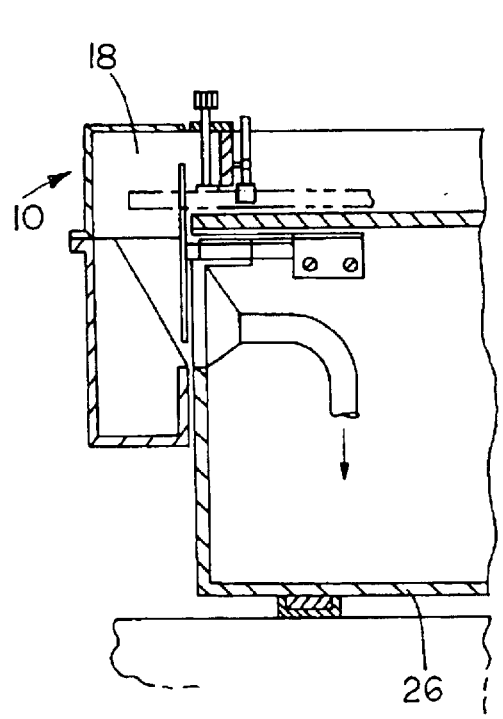
FIG. 17 is a cross-sectional view of the apparatus taken generally along lines 17—17 of FIG. 4.

Referring to FIGS. 3 and 17 the housing 20 of the cutting center 10 includes a bottom 26, a front wall 28, a first and second side wall 30, 32, a rear wall 34, and a top working surface 36. For purposes of this application the cross housing direction is defined as the direction that is perpendicular to the front wall 28 and rear wall 34. Similarly, the longitudinal direction will be defined as the direction that is perpendicular to the first and second side walls 30, 32. The right side of the housing 20 will be defined from the perspective of an operator as they face the bay 14. Accordingly, the first side wall 30 is on the right side of the housing, while the second side wall 32 is on the left side of the housing. The longitudinal axis of the housing will be defined as an axis extending centrally on the top working surface 36 and perpendicular to the first and second side walls 30, 32. The cross center axis will be defined as an axis extending centrally on the top working surface 36 and parallel with the cross housing direction. The cross center axis is perpendicular to the longitudinal axis.

Figure 2:
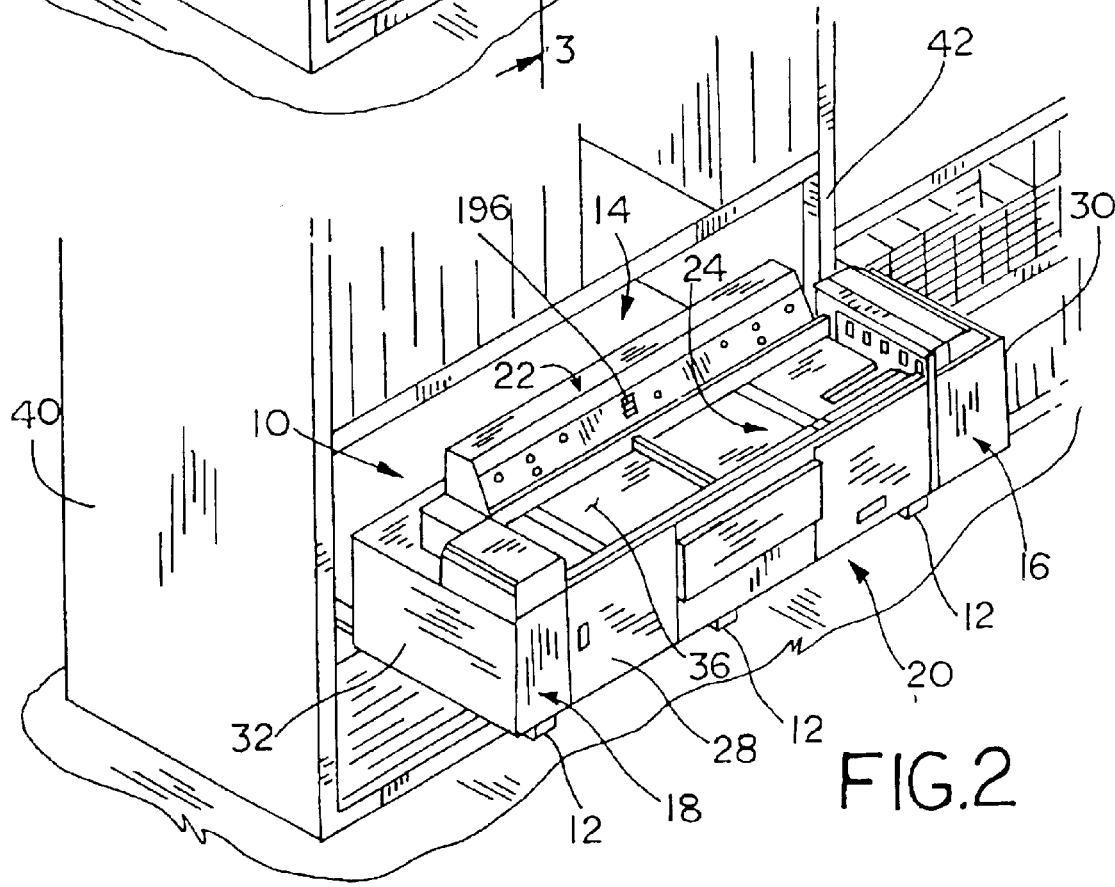
FIG. 2 is a perspective view of the cutting apparatus of FIG. 1 in an operating position.

Housing 20 may be moved from a stored position (as illustrated in FIG. 1) in which the housing 20 is located within the bay 14 to an operating position (as illustrated in FIG. 2) in which the housing 20 is located substantially outside of the bay 14. The stored position permits the housing to be completely out of the aisle of a retail or mass merchandising outlet. In the operating position, the housing is 15 accessible for an operator to size a blind or shade product as will be described below. While it is possible to size a blind or shade product while the housing is in the stored position, the length of the product to be sized may be limited by the size of the bay.

The bay 14 typically includes a front surface 38 and a first and second side support 40, 42. The supports 40, 42 may be in the form of a wall or may be in the form of a frame. When the housing 20 is in the stored position, the front wall 28 may be flush with the front surface 38 of the bay or may be located a distance within the bay from the aisle to ensure that no part of the cutting center 10 protrudes into the aisle. Further, if the cutting center 10 is completely located within the bay 14, the possibility of being damaged by a forklift or customer carts is minimized.

Housing 20 may include a handle or handles (not depicted) to facilitate sliding the cutting center 10 in and out of the bay 14 on the rails 12. All of the equipment employed in center 10 is attached to the housing 20. The only portion of the center 10 that extends outward from the housing 20 is a vacuum bag 44 of a vacuum 46 (See FIG. 3). A duct 47 extends between the vacuum 46 and the vacuum bag 44 and can extend through the rear wall 34. The depth of the housing 20 as measured in the cross housing direction is less than the depth of the bay 14. This permits the vacuum bag 44 to be situated behind the housing 20 when the center 10 is in the stored position. Of course the vacuum bag 44 could also be stored inside of the housing 20 and accessed through the rear wall 34 by an access means such as a door.

As will be described below the preferred embodiment includes a center locating and measuring system as well as an end locating and measuring system. Both systems allow the operator to size a blind or shade by referring to only the customer's specification of the final size and length of the blind. In contrast, other sizing methods required the operator to calculate the amount of material to be removed from each side of the blind and locate the blind relative to the sizing station accordingly. This may lead to errors in the final product, resulting in both scrap material as well as a delay in the time it takes to deliver a final sized product to the consumer.

The center locating system positively locates the center of the blind to be sized, while the end locating system locates the shade relative to one end of the shade. Where the lift cords are visible to the consumer such as in a Venetian blind or a pleated shade it is important that the lift cords remain symmetrical about the center of the blind. The center locating system employs a half scale that permits an employee to size the blind by referring to only the customer's final width of the blind. In contrast, the end locating system may be used for cellular shades where the lift cords are hidden from view and it does not matter that the lift cords are not symmetric about the center of the shade. Similarly, the end locating system may be used for a vertical blind head rail and vanes where the products may be sized from a single end.

Figure 20:
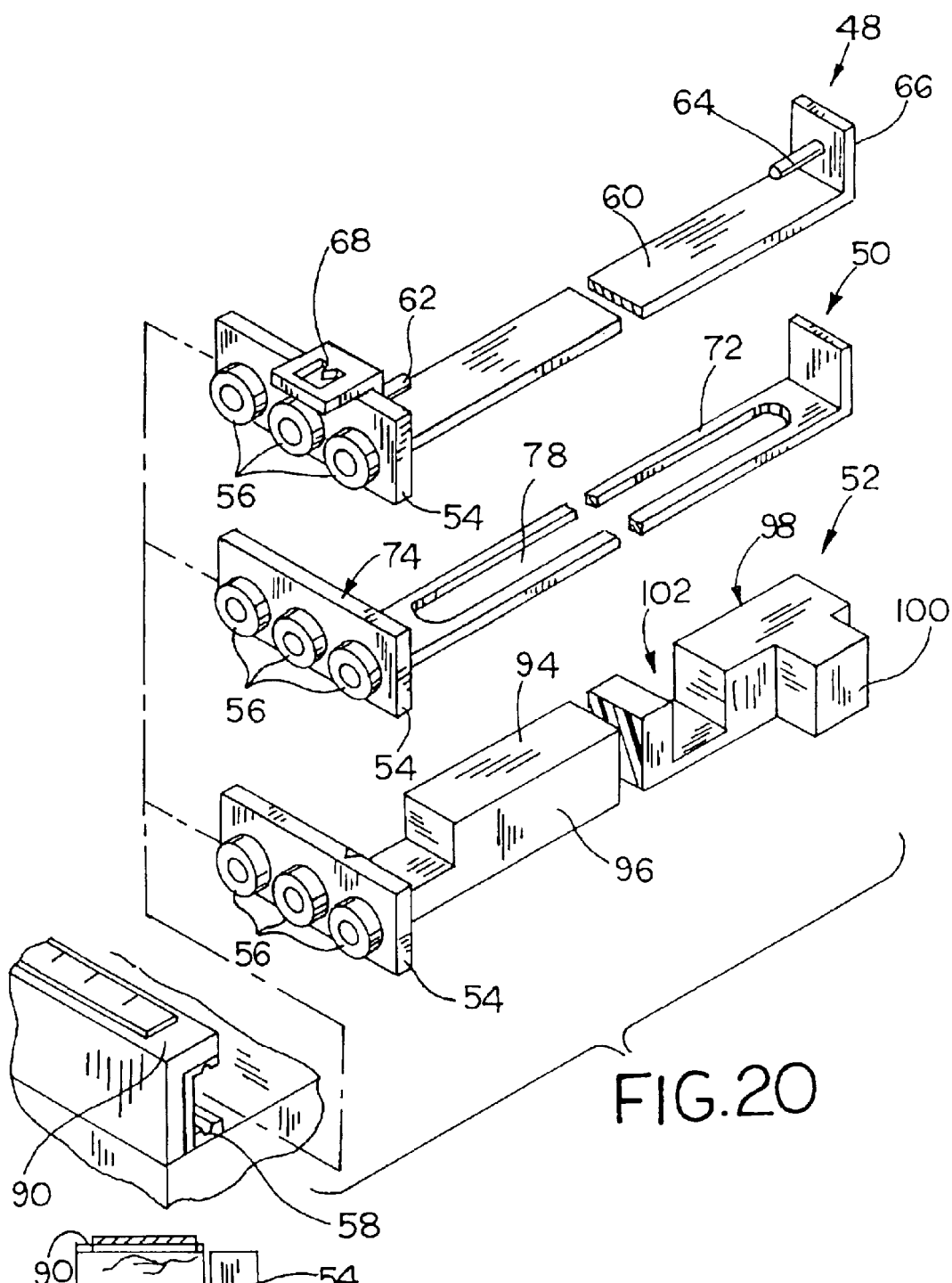
FIG. 20 is an exploded perspective view of three locators, rail and scale.
Figure 21:
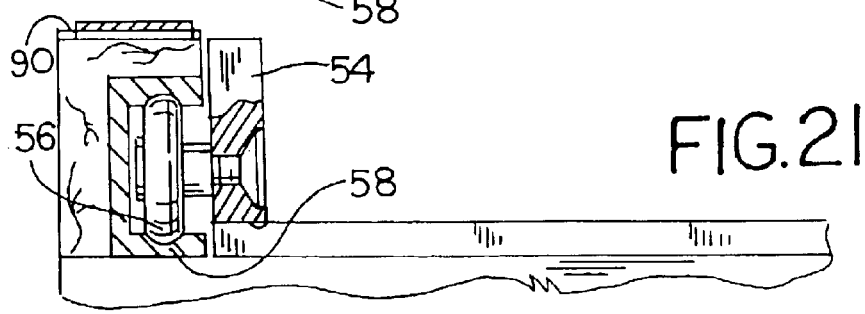
FIG. 21 is a cross-sectional view of the apparatus of FIG. 20.

Referring to FIGS. 4 and 20, the pin locator 48, the center clip locator 50, and the end locator 52 are illustrated. Each locator 48, 50, 52 is attached to a respective carriage 54 having a plurality of rollers 56 that are slidably received in a rail 58. The rail 58 extends proximate the front wall 28 of the housing 20 and parallel to the longitudinal axis of the housing 20. The rail 58 and carriage 54 device is available commercially and marketed under the trade mark Redi Rail™. The pin locator 48 and the center clip locator 50 illustrated in FIG. 20 are center locating devices that positively locate the center of the blind or shade to be sized. The end locator 52 is a locating device that is used to both square the blind or shade and to locate certain blind and shade products relative to one end of the blind.

The pin locator 48 and the center clip locator 50 both permit a blind to be sized from its center by engaging a center portion of the blind. The pin locator 48 includes an extension member 60 attached to the carriage. A pointer 68 is attached to the carriage 54 and indicates that position of the pin locator 48 relative to the first or second cutting stations 16, 18 by use of a scale as discussed below. The extension 60 extends in the cross housing direction from the carriage 54 toward the rear of the top working surface 36. A first pin 62 extends from the carriage 54 parallel with the top working surface 36 of the housing 20 and towards the rear wall 34. The first pin 62 is located a predetermined distance above the top working surface 36. A second pin 64 may extend from the rear portion 66 of the extension 60 toward the front wall 28 a predetermined distance above the top working surface 36.

Pins 62 and 64 each have a cross section that corresponds to the cross section of an aperture in the bottom rail of the shade or blind. In the example illustrated in FIG. 6, the pin 62 has a cross shaped cross section. However, any other shape may be employed as well, for example a round cross section may be used. Pin locator 48 includes a pointer 68 that identifies the location of the pins 62, 64 relative to the first scale 70.

The center clip locator 50 is illustrated in FIGS. 4 and 20. The center clip locator 50 includes an extension 72 attached to the carriage 54 for slidable movement in the rail 58. A pointer 74 is attached to the center clip locator 50 that identifies the position of the locator relative to a second scale 76. The extension 72 of the center clip locator 50 includes a slot 78 having a width configured to receive and positively locate a center clip 80 attached to the center portion of the blind head rail or bottom rail (See FIG. 22.).

Figure 22:
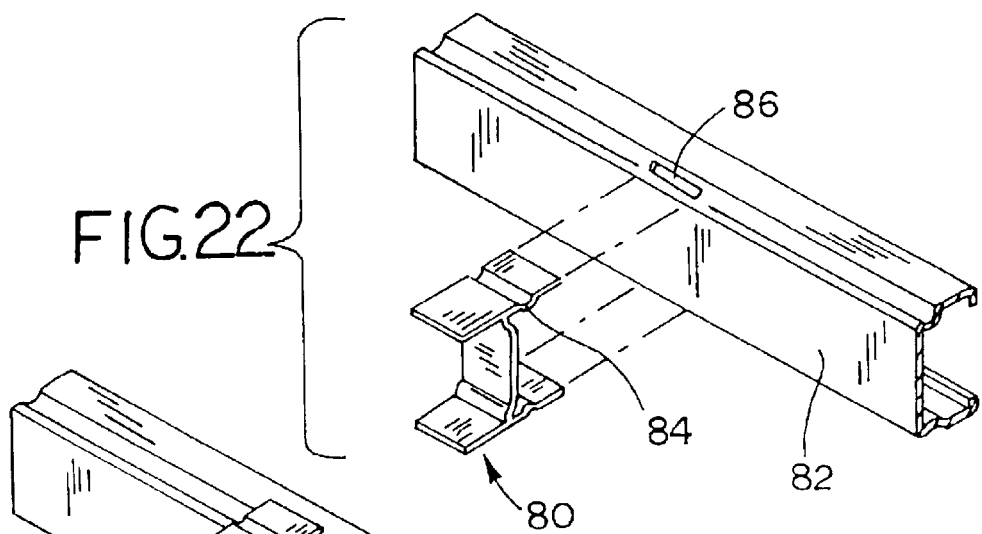
FIG. 22 is an exploded perspective view of the connector clip and head rail aperture.
Figure 23:
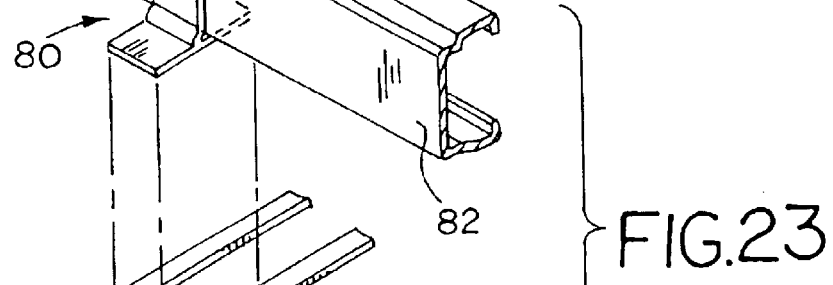
FIG. 23 is an exploded perspective view of the connector clip of FIG. 22 attached to the head rail aperture, and a portion of the locator.
Figure 24:
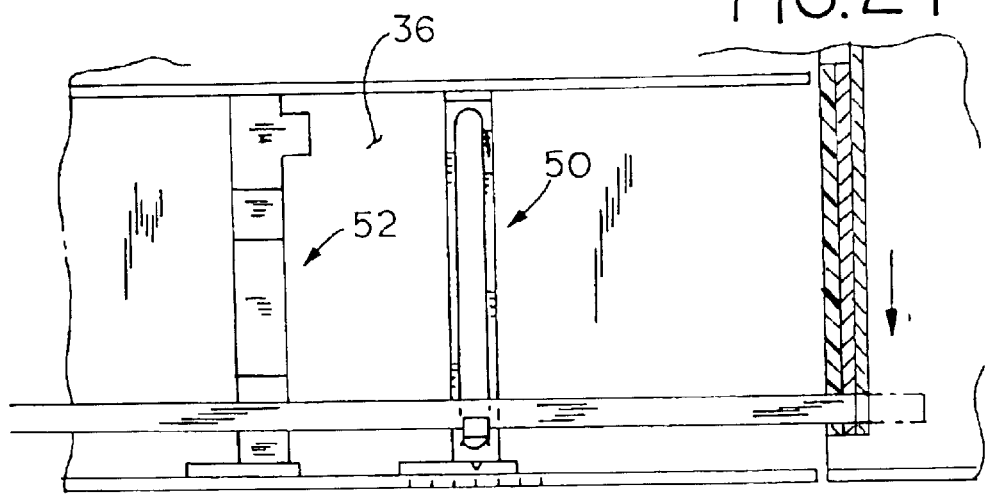
FIG. 24 is a top partial view of the head rail and connector clip positioned by the locator.

Referring to FIGS. 22 and 23, the center clip 80 is positively secured to a head rail 82 or bottom rail by positive location of a protrusion 84 of the center clip with an aperture 86 or other locating device in the center of head rail 82. Alternatively, the center clip 80 could include an aperture that is positioned relative to a detent or tab located on the head rail. Further, any other mechanical means of locating the center clip 80 onto the head rail may be employed. In the preferred embodiment the center clip 80 is made of a resilient material such that the center clip 80 may simply be located in the center of the blind head rail prior to sizing and maintained in place by the spring force of the center clip 80.

As illustrated in FIG. 4, the pin locator 48 is positioned on the right side of the cutting center 10 and the center clip locator 50 is positioned on the left side of the cutting center 10. However, this orientation is for illustration purposes only. It is possible that cutting center 10 includes two pin locators 48 on both the right and left sides of the cutting center or two center clip locators 50 on both the right and left sides of the cutting center 10. Any combination of locators 48, 50 may be employed depending on the type of locating system that is used to locate the actual products to be sized.

Figure 11:
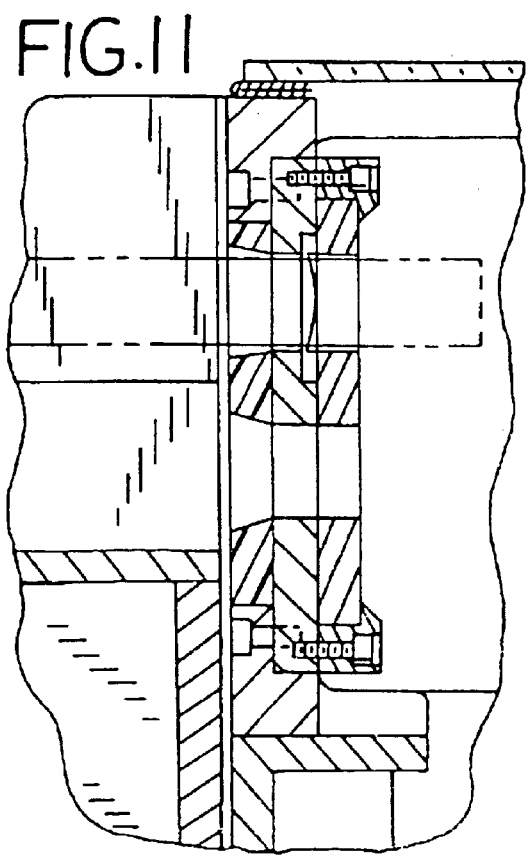
FIG. 11 is a cross-sectional view of the cutting mechanism taken generally along lines 11—11 of FIG. 8.

The pin locator 48 as illustrated in FIG. 4 is slidably positioned relative to a cutting plane 88 (See FIGS. 10 and 11) of the first cutting station 16 by the first scale 70. The first scale 70 is located on the right side of a raised portion 90 proximate the rail 58 (FIG. 20). Similarly, the center clip locator 50 is slidably positioned relative to the cutting plane 92 (See FIG. 15) of the second cutting station 18 by the second scale 76.

The first and second scales 70, 76 each include half scale indicia and extend proximate the front edge of the top working surface and parallel to the longitudinal axis. The first and second scales 70, 76 include half scale indicia where each unit of measurement is identified as twice its actual distance from the cutting planes of the first and second cutting stations respectively. For example, a distance of fifteen inches (15") from the cutting plane 88 of the first cutting station 16 is identified as thirty inches (30") on the half scale indicia.

The half scale indicia allows an employee or operator to size a window blind by only knowing the final desired width of the window blind. The width of the window blind is defined as the horizontal distance between the two sides of the window blind when the window blind is installed relative to the window or opening to be covered. The height of the window blind is the vertical distance that the window blind or shade covers. The term "length" as it is used in conjunction with the Venetian window blind head rail, slats or bottom rail will correspond to the width of the window blind.

Referring to FIGS. 4 and 20, end locator 52 includes an extension 94 attached to carriage 54 for translation along rail 58. Extension 94 extends from the carriage 54 in the cross housing direction and includes a first side 96 and a second side 98 parallel to the first side 96. The first side 96 faces the first cutting station 16 while the second side 98 faces the second cutting station 18. As will be described below the first and second sides 96, 98 of the extension 94 extend a sufficient distance from the top support surface 36 to engage the ends of the blind or shade to be sized to help align the head rail, bottom rail and window covering material for sizing. Further, the first side 96 is also used to locate the cellular shade as will be described below. End locator 52 further includes a set block 100 extending from the first side 96 a set distance toward the first cutting station 16. The end locator further includes a cut out region or a depression 102 in the top portion of the extension 94 that permits a portion of the cellular window covering material of the cellular blind to extend through the extension 94 when the head rail and bottom rail are being sized. The end locator is positioned between the right and left locators, which as illustrated in FIG. 4 is the pin locator and center clip locator respectively. Of course, as noted above, the right and left locators may both be pin locators or center lip locators.

Referring to FIGS. 7–10, first cutting station 16 will be described in further detail. First cutting station 16 includes a stationary die 104 and a moveable die 106 slidably coupled to the stationary die 104. A guiding die member 108 is secured to a first face 110 of stationary die 104 to provide a plurality of beveled or flared surfaces 112 for guiding the various bottom rails, slats and head rails of the blinds and shades to be sized into openings in the stationary and movable dies 104, 106.

Referring to FIG. 8, the stationary die 104 includes three regions for cutting three different types of window covering products. The first region 114 is configured for sizing a mini-blind product having metal or aluminum slats and a metal head rail and bottom rail. This mini-blind product will be referred to as the metal mini-blind product. First region 114 of the stationary die 104 includes a first channel 116 for receiving a bottom rail of a mini-blind product, and an opening 118 for receiving a plurality of metal or aluminum slats from the metal mini-blind product. Further, first region 114 of stationary die 104 also includes a second channel 120 for receiving the head rail of the metal mini-blind product.

Additionally, stationary die 104 includes a second region 122 for sizing a mini-blind having a plurality of vinyl slats. This mini-blind configuration will be referred to as a vinyl mini-blind product. This second region includes a channel 124 for receiving the bottom rail of a vinyl mini-blind product having vinyl slats and a second opening 126 for receiving the vinyl slats, and finally a third channel 128 for receiving the head rail of the vinyl mini-blind product.

The third region 130 of stationary die 104 is for sizing a pleated or cellular shade and includes a first pair of channels 132, 134 for receiving the ends of a head rail and bottom rail from a pleated or cellular shade. Similarly, third region 130 may include a second pair of channels 136, 138 for receiving the second ends of the head rail and bottom rail from a pleated or cellular shade, when the head rail and bottom rail are not symmetric. However, in the preferred embodiment, the head rail and bottom rail are symmetric and therefore only a single pair of channels is required. Accordingly, the second pair of channels 136, 138 is shown in phantom lines. The third region 130 also includes an opening 140 for receiving the pleated or cellular material to be sized.

Referring to FIG. 9, the movable die 106 similarly has three regions that correspond with the respective three regions of the stationary die 104. The first region 142 of the movable die 106 includes a first die opening 144 to receive both the portion of the bottom rail and metal slats of the metal mini-blind to be sized. A first blade 146 is attached to the movable die 106 and separates the first die opening 144 from a second die opening 148 that receives the portion of the head rail to be sized. The first blade 146 is fastened to the movable die and includes a cutting surface 150 that is proximate the stationary die 104. First blade 146 cuts both the metal slats and the bottom rail. The geometry of the first blade 146 permits the metal slats and bottom rail to be sized with the same blade without the blade chipping when it cuts the bottom rail member. First blade 146 has an arcuate surface that corresponds to an arcuate portion on the outer surface of the stationary die 104. However, other known cutting shapes may also be employed.

The second, region 152 of the movable die 106 is located below the first region 142. The second region 152 includes a first opening 154 to receive both the portion of the bottom rail and vinyl slats of a vinyl mini-blind to be sized. A second blade 156 is attached to the movable die 106 and separates the first opening 154 from a second opening 158 that receives the portion of the vinyl mini-blind head rail to be sized. The second blade 156 is fastened to the movable die 106 and includes a sharpened edge 160 that is proximate the stationary die 104.

The third region 162 of the movable die 106 is situated in line with the first region of the movable die such that it corresponds to the third region 130 of the stationary die 104. The third region 162 includes a first opening 164 and a second opening 166. A shearing portion 168 is located proximate the first opening 164 and a shearing portion 170 is located proximate the second opening 166. However, a single opening and shearing portion may also be used.

Finally, the third region 162 of the movable die includes a third opening 172 for receiving the cellular or pleated shade material to be sized. A blade 174 is attached to the movable die 106 and has a blade edge 176 to cut the cellular and pleated material as the movable die 106 is moved from a retracted position illustrated in FIG. 8 to the fully extended position illustrated in FIG. 9.

Figure 18A:
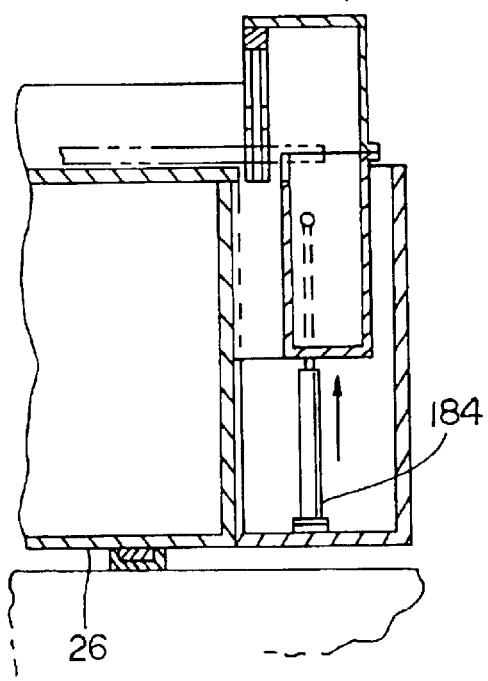
FIG. 18 is a partial cross-sectional view of the first cutting station in the lower position.
Figure 18B:
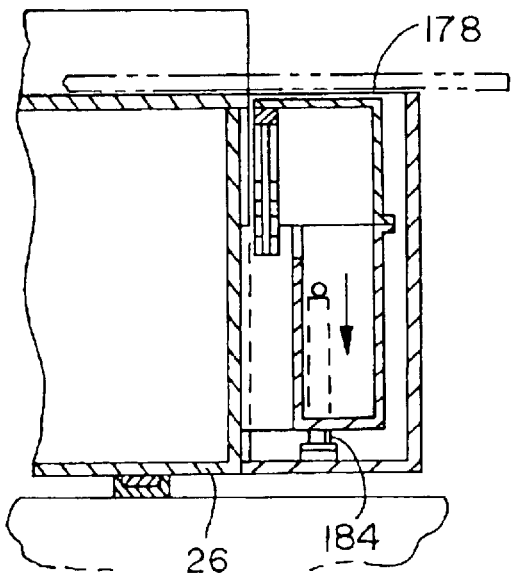

As illustrated in FIGS. 17, 18a, and 18b the stationary and movable dies 104, 106 are attached to a frame 178 that is movable from a first position in which the first regions 114, 142 and third regions 130, 162 of the stationary and movable dies 104, 106 are proximate the top working surface 36 of housing 20, to a second position in which the second regions 122, 152 are proximate the top working surface 36. Further the frame 178 may be moved to a third position in which the entire first cutting station 16 is lowered to a position below the top working surface 36 to facilitate the sizing of vertical blind slats having a length greater than the width of the housing 20.

Figure 27:
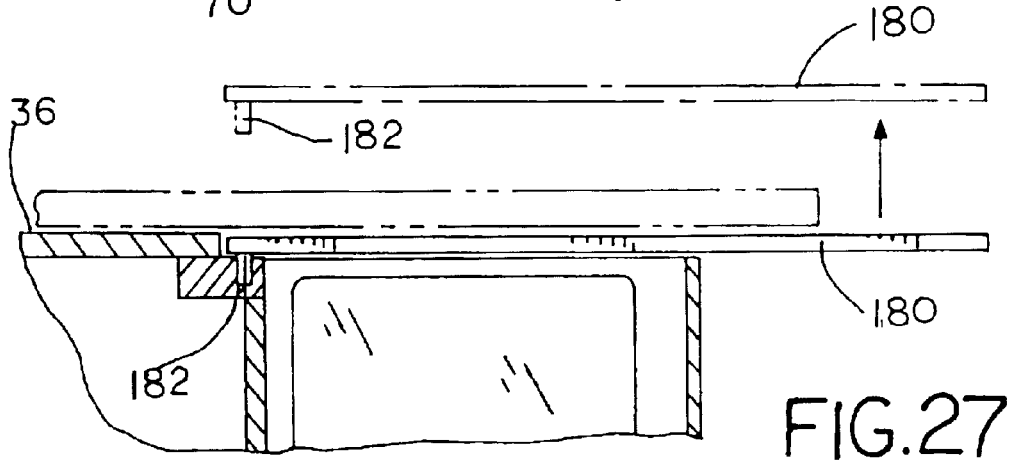
FIG. 27 is a cross-sectional view of the measuring device extension.

When the entire first cutting station 16 is lowered to a position below the top working surface 36, an extension scale 180 may be attached to the housing (See FIG. 27). A vertical peg 182 fastens the extension to the housing 20 so that the extension scale 180 remains in a plane parallel with the top working surface 36. This feature allows a simple disassembly upon raising the first cutting station 16 and also allows the extension scale 180 to slip out of its position on the housing if the first cutting station 16 is raised without first removing the extension scale 180. Further, if the housing is moved back into the bay before removing the extension scale 180, the scale will simply pivot about the peg 182 to prevent damage to the extension scale 180 or to the housing.

In the preferred embodiment, the frame is moved between the first, second and third positions with a hydraulic piston 184 that is controlled by the controller 22. The hydraulic piston 184 is shown in FIGS. 17, 18a and 18b.

Figure 19:
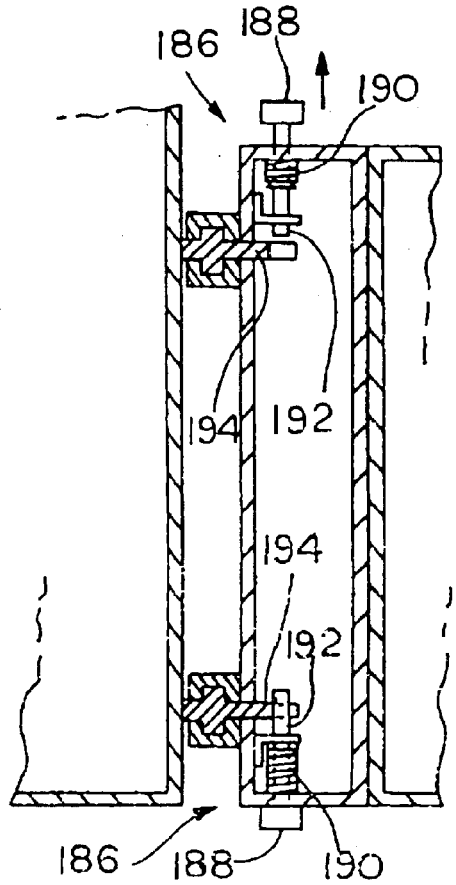
FIG. 19 is a cross-sectional view taken generally along lines of 19—19 of FIG. 18.

In an alternative manual embodiment illustrated in FIG. 19 a pair of spring biased release mechanisms 186 is located on either side of the frame 178 to releasably secure the frame in the first, second or third positions. Each release mechanism 186 includes a spring biased button 188, each having a spring member 190 biasing a pin 192 into engagement with one of three pairs of support members 194 attached to housing 20. By manually pulling the engaged pair of buttons 188 in an outward direction, the pins 192 are released from the support member 194 and the frame 178 may be moved upward or downward to another one of the pair of support members. In this manner, the first cutting station 16 may be moved manually between the first, second and third positions.

The method for sizing a metal mini-blind product utilizing the cutting center 10 will now be described in detail. As discussed above, cutting center 10 can cut more than one type of mini-blind or shade product. The first cutting station 16 includes two different regions for cutting two different types of mini-blind products. The mini-blind products could have different geometry necessitating different die openings, and/or different shearing configurations, and/or different blade combinations. In the example illustrated in the figures the first cutting station 16 permits the sizing of two different mini-blind products formed of different material and having a different geometry. In the preferred embodiment, the first regions 114, 142 of the stationary and movable dies 104, 106 of the first cutting station 16 are configured to size a metal mini-blind product having a metal bottom rail, a metal head rail and aluminum slats. The second regions 122, 152 are configured to size a vinyl mini-blind product having vinyl slats.

A customer will measure the width of the window or windows to be covered and bring this dimension to a retail outlet to purchase a mini-blind product. If the mini-blind product in stock does not match the dimensions required by the customer, an employee/operator will size a stock size mini-blind product to the customer's specified dimension. This system only requires that the operator select the stock mini-blind product having a width greater than that required by the customer. The operator, as will be described herein, does not need to calculate the difference between the stock product and customer's dimensions, nor does the operator need to divide the difference between the stock mini-blind product and the customer's specifications. The operator will cut a portion of the head rail, bottom rail and window covering material from each end of the stock mini-blind product, without the need to know any value but the customer's desired end width of the mini-blind. By removing material from both ends of the mini-blind product as described below, each pair of lift cords will remain an equal distance from each respective end of the mini-blind.

Once the operator has identified and selected the stock mini-blind product closest to, yet wider than the customer's specification, the cutting center 10 is pulled from the stored position in bay 14 as illustrated in FIG. 1 to the extended position as illustrated in FIG. 2. The operator gains access to the center controls by entering a password into the center access panel 196 of the control mechanism 22. The control mechanism 22 may be connected to a computer that identifies the operator seeking access to the cutting center 10. The computer may also store the information entered by the operator including the time of entry. The system may further be programmed to allow the operator to enter information relative to the stock blind being sized as a way of monitoring inventory. Additionally, the time required to size the mini-blind may be recorded. The access panel 196 has the added benefit of prohibiting unauthorized personnel from accessing the cutting center 10.

After the cutting center 10 has been activated by means of the access panel 196, the operator loads the stock mini-blind product onto the top working surface 36. As discussed above, both the pin locator and central clip locator for centrally locating the stock mini-blind to be sized may be utilized. For illustration purposes only, the pin locator will be described for locating the mini-blind product relative to the first cutting station 16 and the center clip locator will be described for locating the wooden mini-blind product relative to the second cutting station 18. However, the center clip locator could be used to locate the mini-blind product relative to the first cutting station as well.

When using the pin locator, the bottom rail of each stock mini-blind product includes a centrally located aperture or opening through the bottom most portion of the bottom rail. The aperture could also be a slot extending perpendicular to the longitudinal axis of the bottom rail, or an indentation or depression or connector or any other means for centrally locating the mini-blind product. The aperture is centrally located in the bottom rail, however, the aperture or locating means could also be located in the head rail. The operator locates the aperture onto pin 62 of the pin locator 48. The portions of the first end of the head rail, bottom rail and slats that are to be cut off are slid through the first regions 114, 142 of the stationary and movable dies 104, 106. The bottom rail is located in channel 116 of the stationary die 104 and opening 144 of the movable die 106. Similarly, the slats are located in opening 118 of the stationary die 104 and opening 144 of the movable die 106. Finally, the head rail is located in channel 120 of the stationary die 104 and opening 164 of the movable die 106.

The stock mini-blind product is positioned relative to the cutting plane 88 of the first cutting center 16 by lining up pointer 68 of the pin locator 48 with the customer's specification on the half scale indicia on first scale 70. The half scale indicia is dimensioned relative to the cutting plane 88 of the first cutting station 16 which is generally defined by the outer surface of the stationary die 104 that determines the location of the sized end of the head rail, bottom rail and slats after the movable die 106 is activated and shears and/or cuts the head rail, bottom rail and slats. The half scale units are one half of the actual distance from the cutting plane. For example thirty (30) inches on the half scale is only one half of thirty (30) or actually only fifteen (15) inches from the cutting plane. Once the movable die 106 is activated the newly cut ends of head rail, bottom rail and slats will be 15 inches from the center aperture.

To activate the movable die 106 in the first cutting station 16, the operator turns on the first cutting station 16 with an on/off switch located on the controller 22. By simultaneously depressing the two activation buttons, the movable die 106 is moved from the rest position to the extended position by a plunger 198 that is driven by a pneumatic or hydraulic cylinder 200. The first blade 146 shears the slats and subsequently the bottom rail, while the shear portion of opening 148 shears the head rail. If the operator releases the activation buttons during the cutting process, the movable die 106 will stop. This feature ensures that the operator's hands are safely away from the movable die 106 during the activation sequence. Once the movable die 106 is fully extended and the first end of the head rail, bottom rail and slats are sized, the movable die 106 retracts to the rest position.

After the first side of the mini-blind product is sized, the operator removes the mini-blind product from pin 62 and rotates it such that the sized end of the mini-blind product is away from the first cutting station 16. The center aperture on the bottom rail of the mini-blind product is once again located on pin 62. Once the mini-blind has been located, the movable die 106 is activated and the second side of the head rail, bottom rail and slats are sized. In this example the desired width of the mini-blind product was thirty (30) inches. Since each side of the blind was sized relative to the central locating hole in the bottom rail, the cut ends of the mini-blind product are fifteen (15) inches from the center for a total mini-blind width of thirty (30) inches. In this manner the lift cords are equal distance from the center of the mini-blind product and equal distance to their respective ends of the sized mini-blind product.

The sizing of the metal mini-blind occurs while the first cutting station 16 is in the first position relative to housing 20 as described above. A vinyl mini-blind is sized in a second position of the cutting station. To move the first cutting station 16 to the second position utilizing the hydraulic piston, the operator utilizes the controller 22 to move the first cutting station 16 to the second position. In the alternative embodiment, the manual release mechanism 186 may be used to move the frame. The buttons 188 of the release mechanism are pulled outward releasing the pins 192 from the support members 194 thereby permitting the operator to move the first cutting station 16 upward until the buttons are aligned with and engaged with a second pair of support members 194. The steps for sizing the vinyl mini-blind in the first cutting station are the same as the steps for sizing the metal mini-blind as described above. However, the vinyl mini-blind is sized in the second regions 122, 152 of the stationary and movable dies 104, 106.

The process of sizing a pleated or cellular shade will now be described. The pleated material is sized independently of the bottom rail and head rail. The shearing portions 168, 170 of the third portion 162 of movable die 106 that are used to size the bottom rail and head rail of a pleated shade are not sharp enough to cleanly cut the material. The pleated material is sized in a separate step from the sizing of the head rail and bottom rail utilizing a sharp blade 174. In a pleated blind the lift cords are visible and therefore it is desirable to have the pair of lift cords be symmetrical with respect to the center of the pleated blind. Accordingly, the pleated blind may be sized in four distinct steps. First one end of the head rail and bottom rail are sized to the final width of the pleated shade. Second, one end of the pleated material is sized. Third, the other end of the head rail and bottom rail is sized. Fourth, the other end of the pleated material is sized.

The steps for removing the cutting center 10 from the bay 14, and accessing the cutting center 10 is the same as that described above for sizing the mini-blind products. Additionally, the first cutting station 16 is moved to the first position to size the pleated shade product. This is the same position as when the metal mini-blind product is being sized.

As with the mini-blind products discussed above, the bottom rail of the pleated shade includes an aperture which is located on pin 64 of pin locator 48. In contrast to the front pin 62 utilized to locate the mini-blind products, the rear pin 64 is utilized to locate the pleated or cellular shade. By using the half scale indicia of the first scale 70, the pin locator 48 is aligned with the finished dimension of the customer's specification.

The first end of the head rail and bottom rail are slid into channels 132, 134 respectively and openings 164, 166 of the movable die 106. The pleated material however, is not slid into any opening at this time, but rather the pleated material is slid relative to the bottom rail and head rail, so that one end of the pleated material extends past the second end of the head rail and bottom rail. The first cutting station 16 is activated as discussed above with respect to the mini-blind products.

After the first ends of the pleated head rail and bottom rail are sized, the pleated material is slid into openings channels 132, 134 of the stationary die 104 and openings 164, 166 of the movable die 106. The dimension of the guide die plate 108 proximate opening 140 does not permit the head rail and bottom rails to pass into opening 140 and is stopped a predetermined distance from the cutting plane. In the preferred embodiment, the distance from the ends is one inch. The end locator is used to size the pleated material. The end locator set block 100 received between the pleated shade bottom rail and head rail such that the set block 100 pushes the pleated material forward the sized end of the bottom rail and head rail a predetermined distance. In the preferred embodiments the set block extends one inch from the first side of the end locator extension to compensate for the one inch distance the bottom rail and head rails are short of the cutting plane 88. In this manner when the pleated material is sized by blade 174 the width of the pleated material is the same as the width of the head rail and bottom rail.

The process is repeated on the second ends of the pleated shade head rail, bottom rail and pleated material. Where the head rail and bottom rail are not symmetric the second ends of the head rail and bottom rail will not fit in channels 132, 134. The second ends of the head rail and bottom rail must be inserted into channels 136, 138 respectively, that are configured to accommodate the different orientation of the second ends of the pleated shade bottom rail and head rail.

Alternatively, the stock pleated shade product may be sized in three steps. First the head rail and bottom rail may be sized by cutting material off from a single end to the final width of the customer's specification. Since the head rail and bottom rail are being sized from one end only, a full scale may be utilized to locate the head rail and bottom rail relative to the cutting plane. The pleated material is then cut equally on both sides in two separate cutting operations so that the lift cords remain symmetric about the center of the head rail and bottom rail.

Figure 25:
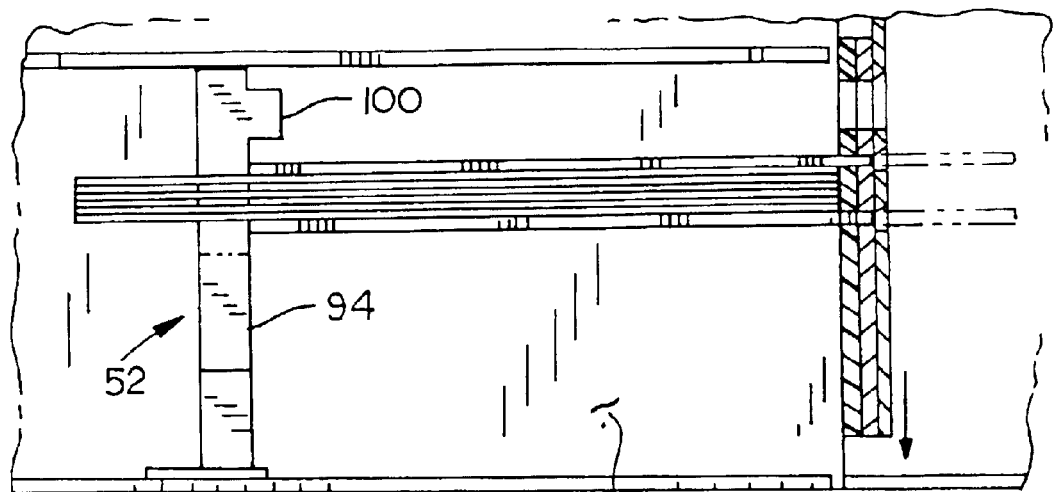
FIG. 25 is a top plan view of the cellular blind head rail and bottom rail positioned in the first cutting station of FIG. 7.
Figure 26:
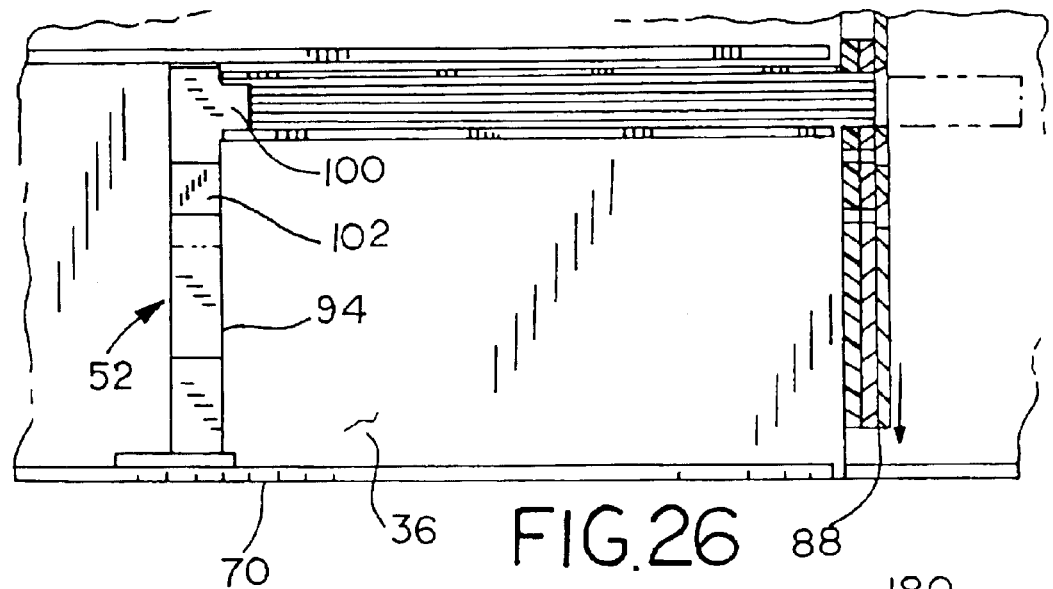
FIG. 26 is a top plan view of the cellular blind shade material positioned in the first cutting station of FIG. 7.

Referring to FIGS. 25 and 26, the sizing of the cellular product in two steps is illustrated. In the first step the entire portion to be removed from the stock cellular head rail and bottom rail is removed in a single operation of the movable die 106. Accordingly, the cellular shade may be located relative to a cellular scale 202 having full scale indicia such that the markings on the scale 202 reflects the actual distance from the cutting plane 88. The end locator 52 is utilized to locate the cellular product to be sized. The head rail and bottom rail of the cellular product are inserted into channels 132, 134 while the other ends of the head rail and bottom rail that are not to be sized are located against the first side of the end locator 52. The first side of the end locator 52 is aligned with the full scale indicia of scale 202 corresponding to the actual width of the blind as requested by the customer. When the head rail and bottom rail are being sized the cellular material is slid away from the ends of the blind to be cut off and towards the second cutting station 18. The cellular material is allowed to pass through end locator 52 extension 94 via opening 102.

Once the head rail and bottom rail have been cut to size, the cellular material is slid past the newly cut ends of the head rail and bottom rail into openings 140 and 172 of the stationary and movable dies 104, 106 respectively. The end locator set block 100 pushes the cellular material the required distance into the first cutting station to ensure that the cellular material will have the same width as the head rail and bottom rail once it is sized. The set block 100 is utilized the same way for the cellular material as for the pleated material discussed above.

Referring to FIGS. 12–16 the second cutting station 18 includes a vertical head rail shearing mechanism 204 and a wooden blind sizing mechanism 206. Vertical shearing mechanism 204 includes a stationary die 208 having a channel 210 for receiving a head rail of a vertical blind product. The stationary die 208 includes a second opening 211 for receiving the traverse rod of the vertical blind product. A movable die 212 moves relative to the stationary die 208 in a vertical up/down direction. Movable die 212 includes a shearing portion 214. Additionally, vertical shearing mechanism 204 includes a punch 216 that punches a hole in the base of the vertical blind head rail a set distance from the cut end of the head rail as described below. A vertically oriented piston 217 moves the movable die 212 upward and downward as illustrated in FIGS. 13 and 14 respectively.

Figure 15:
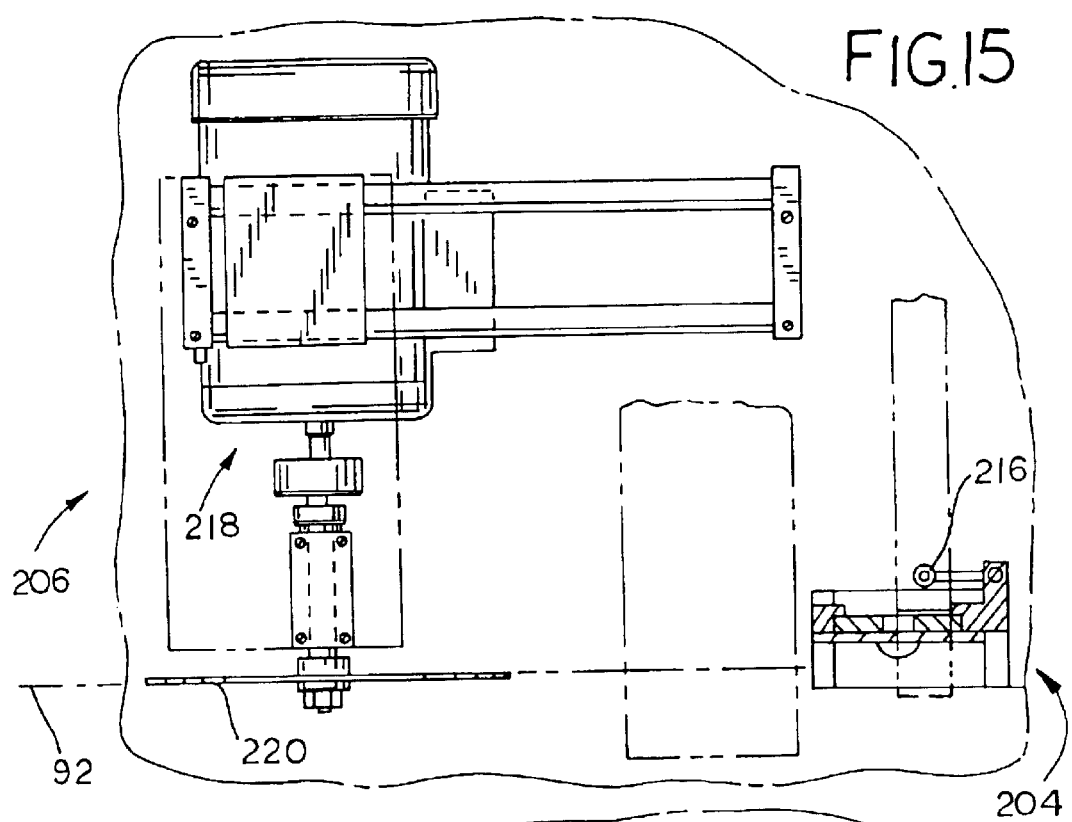
FIG. 15 is a cross-sectional view of the cutting apparatus taken generally along lines 15—15 of FIG. 12.
Figure 16:
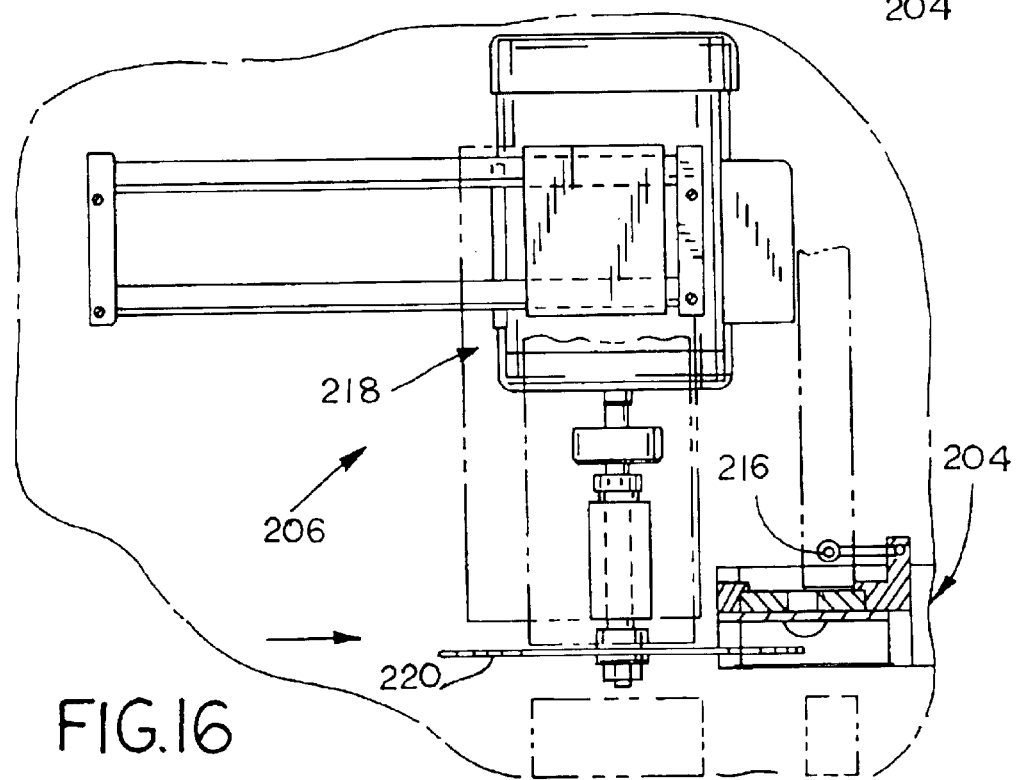
FIG. 16 is a cross-sectional view of the cutting mechanism taken generally along lines 16—16 of FIG. 12 in the extended cutting position.

Turning to FIGS. 12, 15 and 16, the wooden blind sizing mechanism 206 includes a circular saw 218 having a circular blade 220 that moves from a first position proximate the rear wall 34 to an extended position in the cross housing direction toward the front wall 28.

The sizing of a wooden blind having a metal head rail, a wooden bottom rail and wooden slats will now be described. While a pin locator 48 could be used to locate the wooden blind for sizing, the center clip locator 50 will be described in connection with the sizing of the wooden blind. As illustrated in FIGS. 22 and 23, a head rail includes an opening 86 that receives a protrusion or tab extending from clip 80. In this manner the clip is positively located on the center of the head rail 82. The clip 80 is then positioned within slot 78 of the center clip locator 50, which positions the clip and the head rail relative to the second half scale 76. A pointer 74 on the center clip locator identifies the center position of the wooden blind to be sized relative to the cutting plane 92 of the circular saw 218.

Once the head rail and clip are located within the slot of the center clip locator, the wooden blind bottom rail, slats and head rail are slid into a first opening 221 in the second cutting station (See FIG. 28). The wooden blind is located by moving the center clip locator 50 to align the pointer 74 of the center slat locator with the customer's width specification on the second scale 76.

Once the wooden mini-blind is at the proper location to be sized, the end locator 52 is used to square the ends of the head rail, slats and bottom rail, by using the second side extension second side 98. A clamp mechanism 222 clamps the bottom rail, the wooden slats and the head rail against a stop 224 (See FIG. 29) such that the sides of the rails and slats are parallel to the top working surface 36. This removes any space distance between the slats, the bottom rail and the head rail.

Once the bottom rail, slats and head rail have been located within the opening 221 and clamped against the stop 224, the first end of the wooden mini-blind is ready to be sized. As with the first cutting station 16, the operator first enters the access code in the center access panel 22 to allow activation of the second cutting station 18. To activate the sequence for sizing the wooden blind bottom rail, slats and metal head rail, the operator turns on the second cutting station 18 with the on/off switch. By simultaneously depressing two activation buttons, the following sequence is activated. First the vacuum 46 is started and the circular saw 218 is activated and moved toward the front wall 28 along cutting plane 92 cutting the bottom rail, slats and head rail until the bottom rail, all of the slats, and the head rail are each sized. The circular saw 218 is then moved rearward until it is in its fully withdrawn position. In the preferred embodiment the movement of the saw is automated and controlled by the controller 22.

In addition to wooden slats, the circular saw 218 may also size faux wood slats made of a cellulose plastic formulation or of slats made from a plastic material, or any other type of material that can effectively be sized with a circular saw. The circular saw 218 includes a circular saw blade 220 that travels along a cutting path 92.

It is also possible to size a valance for the wooden blind at the same time the head rail, bottom rail and slats are being sized. The valance is simply located adjacent head rail or bottom rail and sized along with the other components.

A vertical blind may also be sized in the second cutting station 18. A vertical blind head rail is sized in the vertical shearing mechanism 204 by locating the vertical blind head rail in the vertical blind head rail channel 210. The vertical blind traverse rod is located within the traverse rod opening 211. Since the vertical blind does not include lift cords, the vertical blind head rail may be sized by removing material from a single side of the stock head rail. Accordingly, a scale 225 having full scale indicia are used to determine the width of the vertical blind. Again, the width of the vertical blind is measured to correspond to the width of the window it will be covering. The cutting plane of the vertical shearing mechanism 204 is not in the same plane as the cutting plane 92 of the circular saw. The vertical shearing mechanism is set inward in the housing to permit the circular saw to fully extend along its cutting plane 92 without contacting the shearing mechanism. The scale 225 measures the actual distance to the cutting plane of the vertical shearing mechanism 204.

The vertical shearing mechanism 204 also includes a punch 216 to place an aperture in the base of the vertical head rail a set distance from the cutting plane of the vertical shearing mechanism 204. The aperture is located a predetermined distance from the cut end of the head rail to receive a portion of a snap in an end cap to be added to the vertical head rail once it has been sized. The aperture could also be used to receive a fastener such as a screw to secure an end cap to the head rail. Punch 216 is pivotally connected to a lever 228 that is pivotally connected to the vertical shearing mechanism 204. The lever 228 is pivotally connected to a head portion 230 of a rod 232 which is slidably located in a holder 234 attached to the movable die 212. The head portion 230 includes a base portion having a diameter larger than the rod 232 and larger than the opening in the holder 234.

The operation of the vertical shearing mechanism 204 for sizing the vertical blind head rail will now be described. Since the vertical blind head rail can be sized from removing material on one side of the head rail, no centering locating mechanism need be used. Rather, the vertical blind head rail can be measured by use of the full scale indicia on scale 226. The end of the vertical blind head rail to be cut is placed in channel 210 and the traverse rod is placed in opening 211. The free end of the head rail that is not being sized is aligned with the full scale indicia indicating the customer's specification for the desired width of the vertical blind product. The vertical slats will be sized to a different measurement, since the important feature of the vertical slats is their vertical length when they are placed over a window. Once the vertical blind head rail and traverse rod are located in the stationary die 208 the operator activates the shearing mechanism by following the steps outlined above of inputting the access code, turning the on/off switch to the on position for the second machine cutter, and depressing the two activation buttons.

The movable die 212 will move in an upward direction until the "v" shaped shearing portion 214 contacts and shears the vertical head rail and the traverse rod. Once the holder contacts the base of the head portion 230, the head portion is moved upward, thereby causing the pivot of lever 228 about its pivot point and causing the punch 216 to extend downwards through the head rail. In this manner, an opening is formed in the vertical head rail a predetermined distance from the sheared end of the vertical head rail.

Once the movable die has reached its fully extended upward position and the head rail and traverse rod have been sheared and the opening has been punched in the head rail, the movable die is retracted downward to the starting position. The vertical blind slats may also be sized in the second cutting station 18 to a customer's specifications. The vertical slats extend in a vertical position and therefore are likely to have a dimension different than the head rail width. The vertical slats are clamped down onto top working surface 36 with a vertical clamp 236 (See FIG. 30) such that the face of the vertical slats are parallel to the top working surface 36. If the vertical blind head rail is longer than the space between the first and second cutting stations 16, 18, the first cutting station 16 may be lowered to a third position as discussed above to allow the vertical head rail to rest horizontally on the top working surface 36. When the first cutting station 16 is lowered to the third position, the top of the frame 178 is substantially flush with or lower than the top working surface. The scale extension 180 is located in housing 20 and extends a full scale 226 (see FIG. 4) that measures the actual distance to the cutting plane 92.

Unlike the wooden mini-blind product in which the bottom rail, slats and head rail are all positioned relative to the second cutting station together, the vertical head rail and vertical slats are positioned and sized separately.

In another embodiment, each scale is used for sizing a specific blind or shade product. Further, each scale may have a separate distinct color that corresponds with the color of the packaging for respective blind or shade product to be sized. As a result, an operator will be able to determine which scale to use to size the stock blind or shade product by matching the color of the stock blind or shade packaging with the appropriate scale. The instructions that are located on the housing may also be in color to further reduce the chance that the particular stock blind or shade product is sized incorrectly. Additionally, the instructions that are located in an instruction manual may also be color coordinated with the scale and stock product packaging. Since the scale, packaging for the blind or shade product and instructions all share the same color for sizing of a specific product, the chance of error decreases, resulting in an easier process for the operator.

In a further embodiment, the locator pin may be eliminated. The blind or shade product may include a mark or feature that is located on its longitudinal center. This mark or feature would be aligned with the appropriate marking on the appropriate scale as discussed above. While the locator devices provide for a positive placement of the blind or shade product, it is possible to locate the center of the blind or shade product by means of a mark such as a line placed on the product in the factory before being shipped to the retain outlet. Of course the mark could also be placed by the operator in the retail outlet as well prior to sizing.

The stock blind or shade product would also have a feature such as an indentation, groove or protrusion on the center of the blind that could be used to locate the stock blind or shade product relative to the scale.

While the detailed drawings, specific examples and particular formulations given describe exemplary embodiments, they serve the purpose of illustration only. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed:

1. An apparatus to size a window covering with first and second ends, the apparatus comprising:
   a housing having first and second ends and a support surface, the support surface being adapted to support the window covering;
   a cutter located at an end of the housing, and adapted to cut an end of the window covering, wherein the cutting of the window covering creates refuse;
   a vacuum motor located inside the housing and adapted to collect the refuse;
   a collection bag disposed outside the housing; and
   a duct extending between the vacuum motor and the collection bag, the duct including a first end connected to the vacuum motor;
   wherein the vacuum motor directs the refuse through the duct to the collection bag;
   wherein the housing is shiftable from a first position in which the collection bag is stored to a second position in which the collection bag is accessible.

2. The apparatus of claim 1, the cutter comprising a circular saw.

3. The apparatus of claim 2, the cutter further comprising a guide thereby defining a cutting path traveled by the circular saw.

4. The apparatus of claim 1, wherein the collection bag is detachably attached to the housing.

5. The apparatus of claim 1, the duct further including a second end connected to the collection bag.

6. The apparatus of claim 5, the housing further comprising at least one sidewall, wherein the duct extends from inside the housing, through a sidewall, to outside the housing.

7. The apparatus of claim 1, wherein the collection bag is maintained adjacent the housing.

8. An apparatus to size a window covering with first and second ends, the apparatus comprising:
   a housing having first and second ends and a support surface, the support surface being adapted to support the window covering;
   a cutter located at an end of the housing, and adapted to cut an ends of the window covering, wherein the cutting of the window covering creates refuse;
   a vacuum motor located inside the housing and adapted to collect the refuse; and
   a collection bag disposed outside the housing and in fluid communication with the vacuum motor;
   the cutter comprising a first movable die and a second stationary die.

9. The apparatus of claim 8, the first movable die and second stationary die further comprising receiving holes sized to receive the ends of the window covering, whereby an end of the window covering is inserted into the receiving holes and sheared by relative motion between the first and second dies.

10. The apparatus of claim 9, wherein the cutter includes a top portion, the cutter being movable from a first operating position to size a window covering to a second retracted position in which the top portion is substantially flush with or lower than the support surface.

11. A window covering sizing apparatus, comprising:
    means for supporting a window covering, the window covering having a first end, a second end, and a middle;
    means for cutting an end of the window covering, wherein the cutting of the window covering creates refuse;
    a vacuum motor located within the support means and adjacent the cutting means and adapted to collect the refuse; and
    a collection bag disposed outside the support means; and
    means for transporting the refuse from the vacuum motor to the collection bag;
    wherein the support means is shiftable from a first position in which the collection bag is stored to a second position in which the collection bag is accessible.

12. The apparatus of claim 11, further comprising means for locating the ends of the window covering a predetermined distance from the cutting means.

13. The apparatus of claim 11, further comprising means for determining the distance from the center of the window covering to the cutting means.

14. An apparatus to size a window covering with first and second ends, the apparatus comprising:
    a housing having a plurality of sidewalls, and having first and second ends and a support surface, the support surface being adapted to support the window covering;
    a cutter located at an end of the housing, and adapted to cut an end of the window covering, wherein the cutting of the window covering creates refuse;
    a vacuum motor located inside the housing and adapted to collect the refuse;
    a collection bag disposed outside the housing;
    a duct with a first end and a second end, the first end connected to the vacuum motor, the second end connected to the collection bag, the duct extending from inside the housing, through a sidewall, to outside the housing, the refuse directed from the vacuum motor through the duct to the collection bag; and
    a slide mounted to the housing such that the housing is shiftable from a first position in which the collection bag is stored to a second position in which the collection bag is accessible.

15. The apparatus of claim 14, the housing movable from a stored position to an extended position.

* * * * *